Nov. 25, 1941.　　　　J. W. DAWSON　　　　2,264,175
CONTROL SYSTEM
Original Filed Jan. 25, 1933　　　5 Sheets-Sheet 1

WITNESSES:
E. A. McCloskey.
R R Lockwood

INVENTOR
John W. Dawson.
BY
M. Crawford
ATTORNEY

Nov. 25, 1941.　　J. W. DAWSON　　2,264,175
CONTROL SYSTEM
Original Filed Jan. 25, 1933　　5 Sheets—Sheet 3

WITNESSES:
E. A. McCloskey
R R Lockwood

INVENTOR
John W. Dawson
BY J. M. Crawford
ATTORNEY

Nov. 25, 1941.  J. W. DAWSON  2,264,175
CONTROL SYSTEM
Original Filed Jan. 25, 1933   5 Sheets-Sheet 4

WITNESSES:  
E.A. McCloskey  
R R Lockwood

INVENTOR  
John W. Dawson.  
BY  
T.M. Crawford  
ATTORNEY

Patented Nov. 25, 1941

2,264,175

UNITED STATES PATENT OFFICE 2,264,175

CONTROL SYSTEM

John W. Dawson, Wilkinsburg, Pa., assignor to Westinghouse Electric & Manufacturing Company, East Pittsburgh, Pa., a corporation of Pennsylvania Original application January 25, 1933, Serial No. 653,451. Divided and this application July 31, 1935, Serial No. 34,003

79 Claims. (Cl. 219—4)

My invention relates, generally, to electrical control systems and it has particular relation to control systems for electric welding.

This application is a division of my copending application Serial No. 653,451, filed January 25, 1933, which in turn is a continuation-in-part of my application Serial No. 503,484, filed December 19, 1930, for Control apparatus, and patented on October 3, 1933, as Patent No. 1,928,812.

In the prior art, the amount of energy that is supplied to a spot welder is controlled by means of mechanical switches which are arranged to close and open the circuit in accordance with some characteristic of the welding circuit, or to operate at the expiration of a predetermined time, or in accordance with the judgment of the operator of the machine. A further means for controlling the current supplied to a spot welder has been provided in using a variable impedance device in the circuit between the welding transformer and the current source, in order to vary the current by changing this impedance from a relatively high value to a comparatively low value.

The mechanical switching system for controlling the current supplied to the spot welder is open to the objection that relatively large currents must be interrupted by it, thereby causing arcs to form which rapidly effect the deterioration of the switch. In addition, due to the great rapidity with which it is necessary to open and close the circuit for performing successive spot welding operations, the life of a mechanically-operated switch is relatively short. In addition, with a switch of this type, it is impossible to control the amount of current that is supplied for performing the welding operation with any degree of accuracy.

The system of current control through the use of a variable impedance device, is open to the objection that the welding current cannot be reduced to a zero value and further that, in order to obtain close control of this system, the vapor electric devices that are used in conjunction therewith must operate in a relatively high voltage circuit.

In the welding of relatively thin sheets of material, such as stainless steel or the like, at high speeds, it is necessary to provide a very accurate control of the energy that is supplied for performing the spot welding operation. This energy control is essential in order to obtain uniform welding results in each of the individual spot welds. In addition, this control is essential in order to minimize the heating of the material so that its rust resisting properties may not be impaired.

It is an object of my invention to provide current control apparatus for operations such as spot welding which shall be simple, efficient and accurate in operation, and which may be readily and economically manufactured and installed.

The principal object of my invention is to provide for accurately controlling the amount of energy which is supplied to a load circuit for performing spot welding operations and the like.

A more specific object of my invention is to provide for applying a predetermined number of cycles of alternating current to a load circuit.

Another object of my invention is to provide for applying a predetermined number of half cycles of alternating current for performing spot welding operations.

Another object of my invention is to provide for applying a predetermined portion of a half cycle of alternating current to a load circuit for performing spot welding operations and the like.

Still another object of my invention is to provide for minimizing transient phenomena in a transformer that is used for supplying current to a load circuit requiring the intermittent flow of power thereto.

Still another object of my invention is to provide for mechanically synchronizing the number of cycles of alternating current that are applied for performing spot welding operations with the frequency of the alternating current source.

Still another object of my invention is to provide for initiating successive spot welding operations or the like on alternate half cycles of the welding current.

A still further object of my invention is to provide for electrically synchronizing the number of cycles that are applied for performing welding operations with the frequency of the alternating current source.

A further object of my invention is to provide for synchronizing the rate at which work is fed for performing spot welding operations with apparatus for controlling the amount of current that is used for performing each spot welding operation.

It is also an object of my invention to provide control circuits for effecting the foregoing objects.

Other objects of my invention will in part be obvious and in part appear hereinafter.

My invention, accordingly, is disclosed in the embodiment hereof shown in the accompanying drawings and comprises the features of construction, combination of elements and arrangement of parts which will be exemplified in the constructions hereinafter set forth, and the scope of the application of which will be indicated in the appended claims.

For a more complete understanding of the nature and scope of my invention, reference may be had to the following detailed description taken in connection with the accompanying drawings, in which.

In place of the mechanical switches and variable impedance devices of the prior art which are used for controlling the application of current to a spot welding system, I have provided two vapor electric devices which are inversely connected between the welding transformer and the source of alternating current. A control system is provided which is synchronized with the frequency of the alternating current source to render the vapor-electric devices conducting for predetermined intervals thereby permitting welding current to flow for predetermined periods of time. The vapor-electric devices are arranged to conduct alternating line currents that may be of a magnitude of 1000 amperes or more, which, as is well known to those skilled in the art, may be increased to several thousand amperes by means of a step-down transformer which is customarily provided with spot welding machines to reduce the relatively high voltage of the supply circuit at a relatively low current to a relatively low voltage for performing the welding operation at a relatively high current.

The control of the vapor-electric devices is accomplished in this instance by means of a drum switch which is driven by a synchronous motor energized from the alternating current source. In a modification of the invention, the time at which the vapor-electric devices are rendered conducting is controlled by means of a discharge tube which, in turn, is controlled by means of a phase shifting device that is energized from the source of alternating current. By means of either of these control systems, it is possible to apply the current for performing the spot welding operations in increments of a half cycle or a portion thereof. It is further possible to permit the vapor-electric devices to become conducting on alternate half cycles, so that the saturation of the welding transformer may be reduced to a minimum.

In order to illustrate and describe my invention, I have shown it in conjunction with a spot welding system. However, it will be understood that it may be used for any purpose in which it is desired to intermittently control the flow of current to a load circuit in the manner herein set forth.

Figure 1:
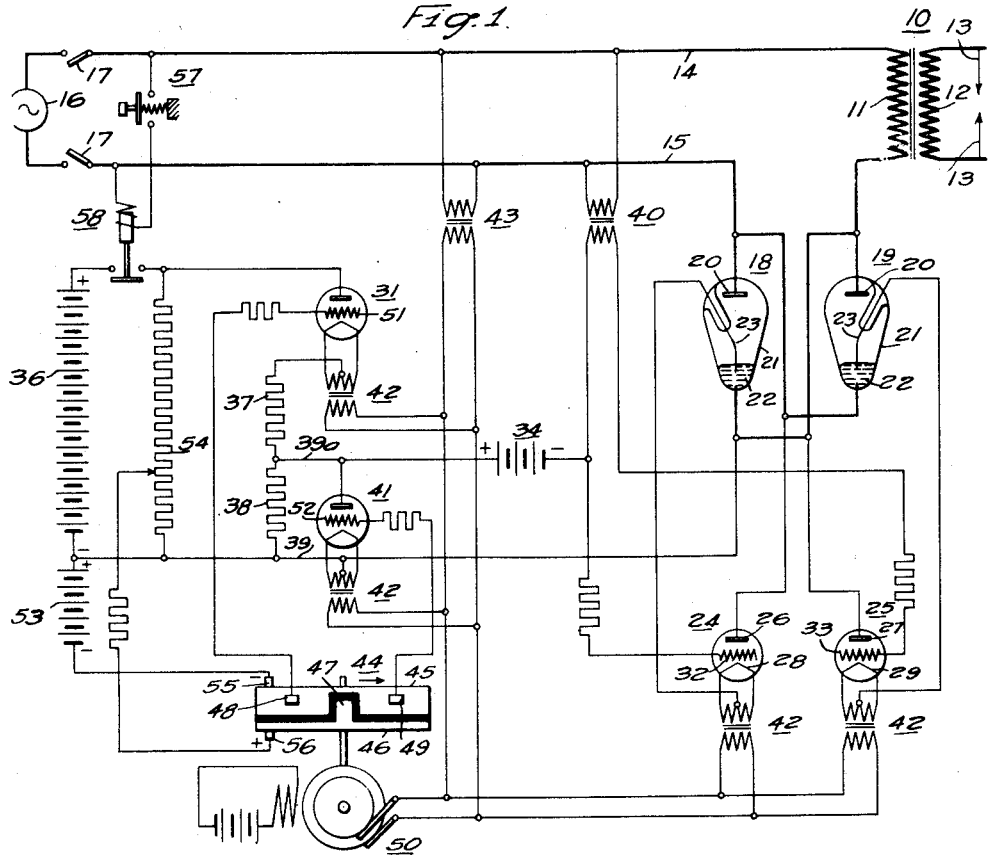
Figure 1 is a diagrammatic view illustrating one embodiment of my invention.

Referring now particularly to Figure 1 of the drawings, the reference character 10 designates, generally, a welding transformer having a primary winding 11 and a secondary winding 12. The secondary winding 12 is connected to the customary welding circuit in which welding electrodes 13 are diagrammatically represented. The primary winding of the transformer 11 is connected by means of conductors 14 and 15 to a source of alternating current 16 through switches 17.

In order to control the application of the welding current from the source 16 to the transformer 10, vapor-electric devices, shown generally at 18 and 19, are provided. The devices 18 and 19 are of the mercury vapor type in which an anode 20 is provided, as illustrated, in a suitable container 21 in the bottom of which is located a pool of mercury 22. The container 21 is evacuated, so that it is then filled substantially only with mercury vapor. In order to render the vapor-electric devices 18 and 19 conducting, a starting electrode or crystal 23 is provided which comprises a material such as boron or the like. The discharge devices 18 and 19 are called ignitrons and the crystal 23 is called an igniter and the counter-parts of these elements will be so designated in certain of the claims.

It has been found that, when a certain amount of current is caused to flow through the starting electrode 23 into the mercury pool 22, a cathode spot is formed which causes the mercury vapor within the container 21 to become conducting, provided that proper polarity is applied to the anode 20 and the mercury pool 22, which forms the cathode. Thus, it is only necessary to pass sufficient starting current through the starting electrode 23 to form the cathode spot, at a predetermined time in the proper half cycle in the alternating-current wave, to render the vapor-electric devices conducting for the remainder of that particular half cycle. In order to conduct succeeding half cycles of alternating current, the vapor-electric devices 18 and 19 are connected inversely. That is, the anode 20 and the cathode 22 of the devices 18 and 19, respectively, are connected together while the cathode 22 and the anode 20 of these devices are connected together, as illustrated in the drawings. It will, therefore, be evident that, if the vapor-electric devices 18 and 19 are rendered conducting, current from the source 16 will flow to the transformer 10 as long as this condition is maintained.

In order to render the vapor-electric devices 18 and 19 conducting, control tubes 24 and 25, of the hot cathode type, are provided and their anodes 26 and 27 are connected to the anodes of the vapor-electric devices 18 and 19, respectively, as shown. The cathodes 28 and 29 of the control tubes 24 and 25 are connected to the starting electrodes 23 of the vapor-electric devices 18 and 19, respectively. The control tubes 24 and 25 are arranged to pass sufficient current through the starting electrodes 23, so that the cathode spot will be formed, as hereinbefore set forth, to render the vapor-electric devices 18 and 19 conducting.

In order to initiate the functioning of the control tubes 24 and 25, a start tube 31, of the hot cathode type, is provided. The start tube 31 is arranged to apply a positive potential to the grids 32 and 33 with respect to the cathodes 28 and 29 of the control tubes 24 and 25 which are normally biased to a negative potential with respect to the cathodes 28 and 29 by means of a battery 34. The positive potential is supplied from a suitable source such as a battery 36 and voltage dividing resistors 37 and 38 which are connected in series circuit relation across the battery 36 when the start tube 31 is conducting. It will be observed that a potential will appear between conductors 39 and 39a connected to the resistor 38, the value of which will depend upon the potential supplied from the battery 36 and the relative resistances of the resistors 37 and 38.

In order to control both of the control tubes 24 and 25 from a single control circuit, a transformer 40 is connected across the alternating current source 16 and to the conductors 14 and 15. The transformer 40 reduces the potentials of the cathodes 28 and 29 to a common point, as will be readily understood by those skilled in the art.

In order to cause the control tubes 24 and 25 to cease functioning, a cut-off tube 41 of the hot cathode type is provided. The tube 41 is arranged to short circuit the resistor 38 on becoming conducting, so that the negative potential will again be applied to the grids 32 and 33 by means of the battery 34.

As is customary, the cathodes of the tubes 24, 25, 31 and 41 are heated from filament transformers 42 which may be energized from a transformer 43 that is connected to the conductors 14 and 15, as illustrated.

The operation of the start tube 31 and the cut-off tube 41 is controlled by means of a drum switch 44 having segments 45 and 46 which are insulated from each other, as shown. The segment 46 is provided with a section 47 which is arranged to successively engage brushes 48 and 49 as the drum switch 44 is rotated, in the direction indicated by the arrow, by means of a synchronous motor 50 that is energized from the transformer 43.

The brushes 48 and 49 are connected to grids 51 and 52 of tubes 31 and 41, respectively, and are arranged to apply a negative potential thereto from a battery 53, except when they are in engagement with the section 47 of the segment 46, at which time they cause a positive potential to be applied to these grids that is obtained from a variable resistor 54 connected across the battery 36. Brushes 55 and 56 are provided for connecting the battery 53 and the variable resistor 54 to the segments 45 and 46, respectively, of the drum switch 44.

In order to initiate the functioning of the control system, a manually-operable push-button switch 57 is provided that is arranged to energize a control relay 58 from the conductors 14 and 15, as shown in the drawings.

In operation, the switches 17 are closed thereby applying an alternating potential to the conductors 14 and 15. The cathodes of the tubes 24, 25, 31 and 41 are heated to normal operating conditions and the synchronous motor 50 is energized to rotate the drum switch 44. However, no current will be applied to the welding electrodes 13, since the vapor-electric devices 18 and 19 have not yet been rendered conducting.

After the work on which the welding operation is to be performed has been positioned between the welding electrodes 13 and they have been applid thereto with the necessary pressure, the operator closes the control switch 57 thereby energizing the control relay 58 and applying positive potential to the anode of the start tube 31. Because of the fact that the grid 51 of the start tube 31 is normally provided with a negative potential from the battery 53, this tube is rendered non-conducting. However, as soon as the section 47 of the segment 46, to which a positive potential is applied, engages the brush 48, a positive potential will be applied to the grid 51 and the start tube 31 will thereupon become conducting and will cause a current to flow through the resistors 37 and 38. The voltage drop which occurs across the resistor 38 is greater than the voltage provided by the battery 34 and, therefore, a positive potential will be applied to the grids 32 and 33 of the control tubes 24 and 25.

Assuming that the operation of the start tube 31 is initiated at the instant that the proper polarity is applied to the vapor-electric device 18, so that it will be conducting if properly initiated, the control tube 24 will become conducting. As soon as the control tube 24 becomes conducting, a starting current is caused to flow through the starting electrode 23 thereby providing the necessary cathode spot which serves to render the vapor-electric device 18 conducting. After the vapor-electric device 18 begins to conduct current, it will continue to do so until the end of the half cycle is reached, at which time it becomes non-conducting for the succeeding half cycle. At this time, however, the proper potential appears on the grid 33 of the control tube 25, so that it becomes conducting and current is caused to flow through the starting electrode 23 of the vapor-electric device 19, which now becomes conducting and permits the succeeding half cycle to flow therethrough. However, at the end of this half cycle it will be readily understood that the vapor-electric device 19 is rendered non-conducting for the succeeding half cycle.

In the event that the start tube 31 is still maintained in the conducting state, the vapor-electric device 18 will again be rendered conducting, as set forth hereinbefore, and in succession the vapor-electric device 19 will again be caused to conduct the succeeding half cycle. As long as the start tube 31 is maintained conducting, the vapor-electric devices 18 and 19 will, therefore function to pass succeeding half cycles of alternating current from the source 16.

When the positive potential is removed from the grids 32 and 33, the control tubes 24 and 25 cease to be conducting and, therefore, the vapor-electric devices 18 and 19 are rendered non-conducting. Since the control tubes 24 and 25 remain conducting as long as the positive potential is applied to the grids 32 and 33, it is necessary to remove this positive potential and reapply the negative potential thereto from the battery 34, so that the control tubes may be rendered non-conducting.

As has been set forth hereinbefore, this is accomplished by means of the cut-off tube 41 which is normally maintained non-conducting because of the negative potential which is applied to the grid 52 by means of the segment 45 of the drum switch 44 that is energized with a negative potential. However, when the brush 49 engages the section 47 of the positively energized segment 46, the cut-off tube 41 becomes conducting and the resistor 38 is short circuited. The control tubes 24 and 25 are thereupon rendered non-conducting and, at the end of the next half cycle, the vapor-electric device 18 or 19 which has been conducting is rendered non-conducting for any succeeding half cycle.

Since the synchronous motor 50 rotates the drum switch 44 in synchronism with the frequency of the alternating current source 16, it will be readily apparent that the position of the brush 48 controls the instant at which the start tube 31 will be rendered conducting and thereby the instant at which current may be applied for performing the welding operation. Thus, the brush 48 may be positioned to render the start tube 31 conducting at the instant when the voltage of the alternating current source 16 is at the maximum value of the wave. Since this point in the voltage wave corresponds to the zero point of the wave representing the flux change in the magnetic circuit of the transformer 10 under steady-state conditions, it will be apparent that if the circuit is completed at this point, there will be a minimum of transient effect in the transformer flux due to the closing of the circuit between the transformer 10 and the source 16 with respect to the voltage wave.

Because of the fact that the power factor of the system is lagging to a considerable extent due to the inherent characteristics of the welding circuit and the transformer 10, the current wave will necessarily lag behind the voltage wave and it may not be desirable to cause the start tube 31 to become conducting at the instant that the voltage wave is at the maximum value. It will be readily apparent, however, that by means of adjusting the position of the brush 48, it will be possible to complete the welding circuit for supplying current for performing a welding operation at any particular point in the current or voltage wave at which it may be found desirable.

The number of cycles that will be applied for performing the welding operation is a function of the distance between the brushes 48 and 49 or, in other words, the time necessary for the section 47 of the positively energized segment 46 to travel from the brush 48 to the brush 49. It will be readily apparent, therefore, that the position of the brush 49 may be so adjusted as to render the cut-off tube 41 conducting just prior to the termination of the second half cycle after the start tube 31 has been rendered conducting to initiate the functioning of the control tubes 24 and 25 and thereby render conducting the vapor-electric devices 18 and 19. With this adjustment of the brush 49, it will, therefore, be possible to pass exactly two half cycles provided that the brush 48 is positioned to initiate the functioning of the start tube 31 at the beginning of the first half cycle.

Due to the inherent conducting characteristics of the vapor-electric devices 18 and 19, it is not necessary to accurately position the brush 49 near the end of the second half cycle. If the brush 49 is positioned so that the cut-off tube 41 is rendered conducting, at any instant after the beginning of the second half cycle and at such time as the corresponding vapor-electric device has become conducting, at different half cycles, the system will function properly. Since the starting current need only be applied to the starting electrode 23 to initiate the functioning of the vapor-electric devices 18 and 19, this latitude in the positioning of the brush 49 will be readily apparent.

It will be observed that the control tubes 24 and 25 are connected in parallel circuit relation with the vapor-electric devices 18 and 19, respectively. For an instant therefore, they carry full line current before the vapor-electric devices 18 and 19 are rendered conducting. However, as soon as the vapor-electric devices 18 and 19 become conducting, the voltage drop across them falls to a very low value and, as a result, the control tubes 24 and 25, being connected in series circuit relation with the starting electrodes which are of relatively high resistance, carry very little of the line current.

Figure 6:
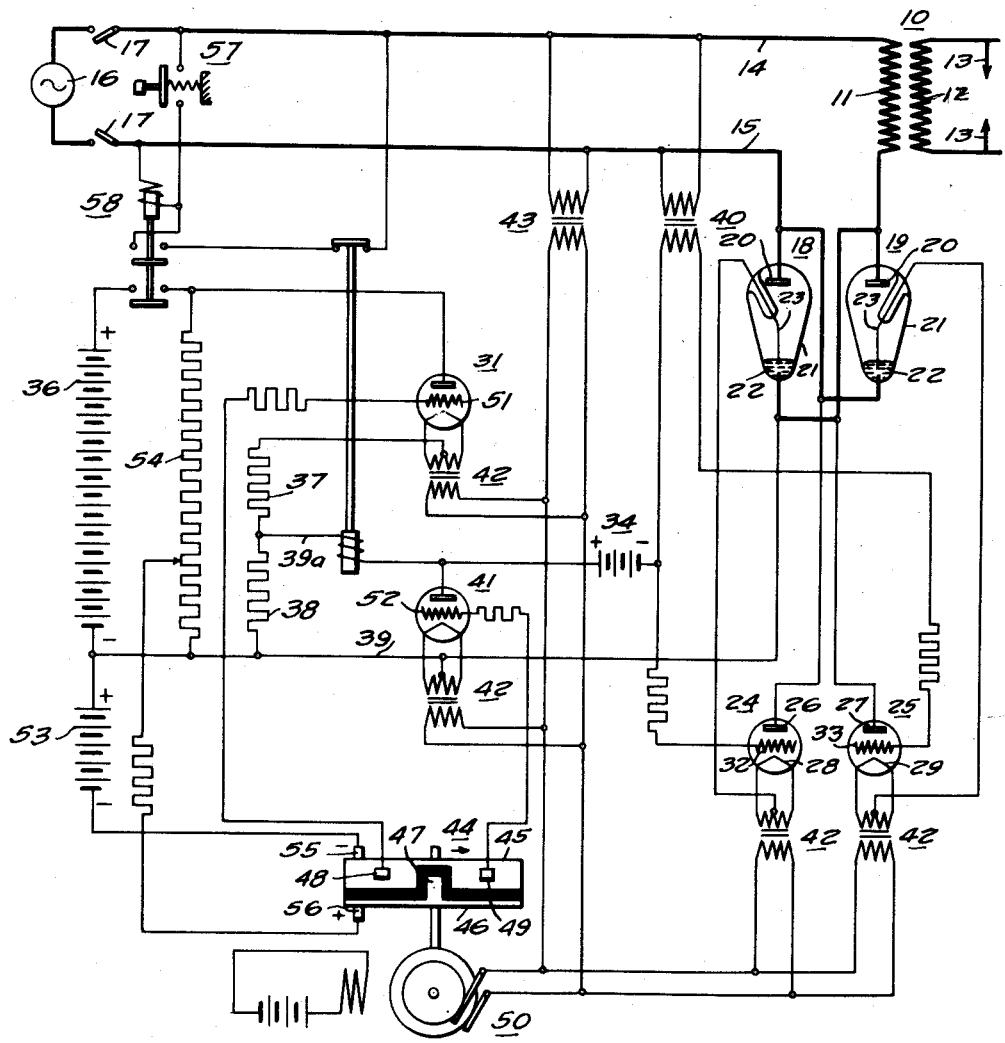
Fig. 6 is a diagrammatic view of another modification of my invention.

It will, therefore, be readily understood that, after the operator has closed the control switch 57, he is relieved from further control of the system since, from that time on, it is entirely automatic provided the switch 57 remains closed for the duration of the welding operation. Therefore, no matter how long the control switch 57 is held closed and thus the start and cut-off tubes 31 and 41 are maintained conducting, no more than the amount of current for which the system has been set will be permitted to flow through the electrodes 13 to perform the welding operation. It is necessary for the operator to release the control switch 57, thereby rendering the start and cut-off tubes 31 and 41 non-conducting because of the opening of their anode circuits before it is possible to again perform the welding operation. It will be readily apparent that the operator may be relieved from holding the control switch 57 in the closed position by means of suitable relay systems well known in the art, such as the system shown in Fig. 6 in which the operation of the cut-off tube 41 is effective to open the circuit to the anode of the start tube 31 when the cut-off tube 41 is rendered conducting.

While, in the preferred embodiment of the invention, the vapor-electric devices 18 and 19 are illustrated as being connected directly in series circuit relation with the conductor 15, it will be readily apparent that the well-known variable impedance type of control may be obtained merely by providing a second transformer, the primary winding of which would be connected in series circuit relation with the primary winding 11 and the conductor 15 and the secondary winding of which would be connected to the vapor-electric devices 18 and 19. The remaining features and functions of the control system for the vapor-electric devices would remain substantially unchanged, as will be readily apparent.

Figure 2:
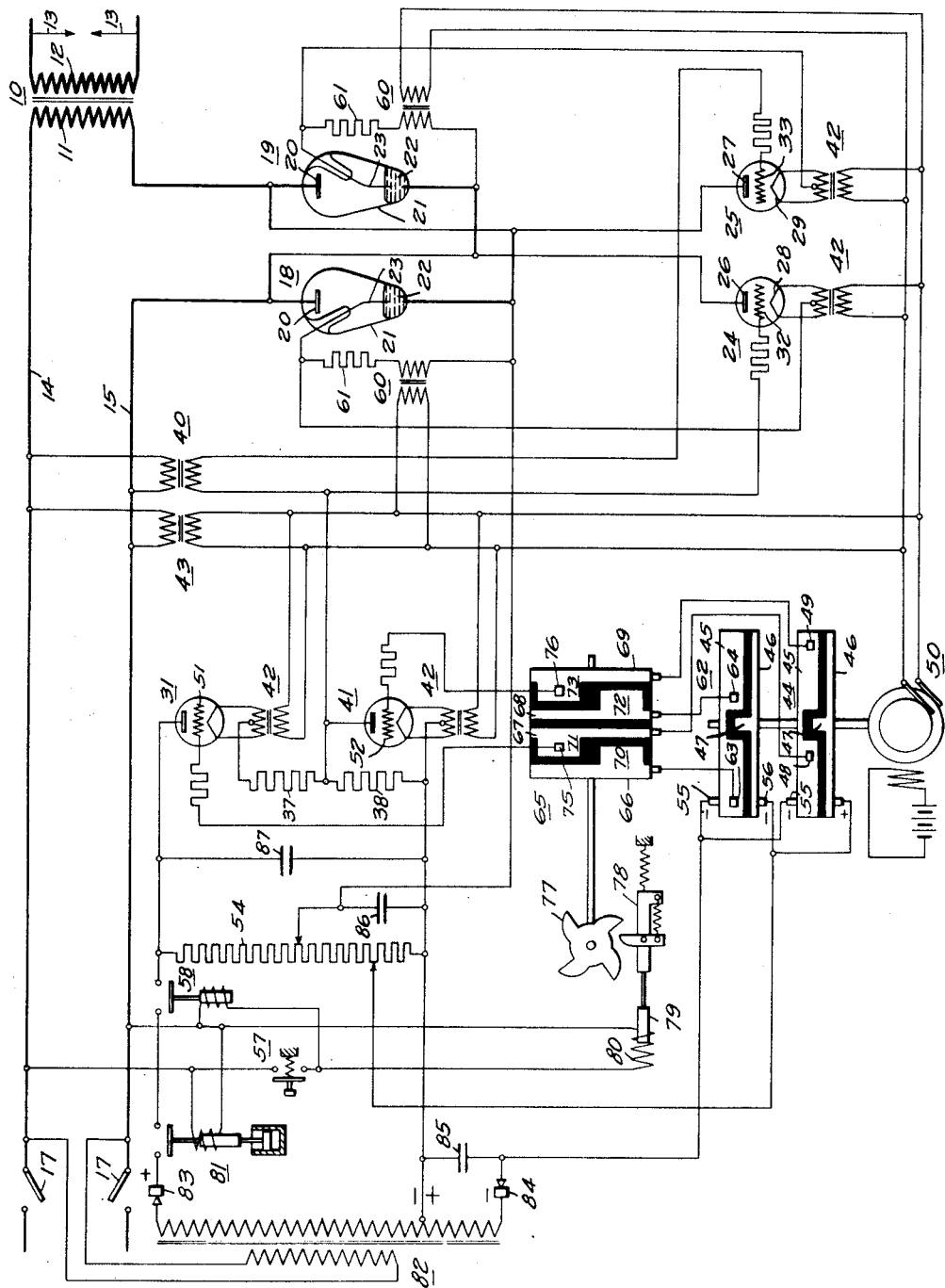
Figs. 2, 3 and 4 are diagrammatic views illustrating modifications of the invention shown in Fig. 1.

Referring now to Fig. 2 of the drawings, the welding system there shown is similar to that illustrated in Fig. 1 of the drawings. However, certain modifications are illustrated in this figure of the drawings in order to extend the scope of the operation of the system.

It has been found that the vapor-electric devices 18 and 19 operate more satisfactory if a small amount of current is passed through the starting electrodes 23, which current is termed a sub-starting current. This current may be supplied by means of transformers 60 which may be energized from the transformer 43. The transformers 60 are connected in shunt circuit relation through resistors 61 to the start electrodes 23 and the mercury pools 22, as illustrated. While the amount of current obtained from the transformers 60 is not sufficient to initiate the functioning of the vapor-electric devices 18 and 19, it is sufficient to maintain the starting electrodes 23 in proper operating condition.

In the event that it is desired to apply three half cycles of current to the transformer 10 or an equivalent unbalanced amount of current, it will be apparent that the magnetic circuit of the transformer 10 will rapidly become saturated, if this unbalanced current is applied during successive welding operations. It will be readily understood that the saturation of the magnetic circuit of the transformer 10 is caused by the direct current component of the alternating-current which is supplied to the transformer 10 unsymmetrically. It is desirable, therefore, to reverse the application of the current to the transformer 10 for each succeeding welding operation so that there may be no resulting direct current component in the current flowing through the transformer 10 with the result that the magnetizing current thereof will be reduced to a minimum. This reversal of the application of current is obtained by causing the start tube 31 to become conducting 180 electrical degrees removed from the time at which it last became conducting for each successive time that the welding operation is performed. That is, assuming that for one operation the start tube 31 is rendered conducting during a positive half cycle and is maintained conducting until successive negative and positive half cycles have been passed through the vapor-electric devices 18 and 19, then for the succeeding welding operation the start tube 31 is caused to be conducting during a negative half cycle so that a succeeding positive half cycle and negative half cycle will be passed by the vapor-electric devices 18 and 19.

In order to accomplish this reversal of the current which is applied to the welding transformer 10, a second drum switch 62 is provided which is similar to the drum switch 44 both of which are driven by the synchronous motor 50. The corresponding segments 45 and 46 of the drum switch 62 are energized with a negative and positive potential, respectively, in the same manner as the corresponding segments 45 and 46 of the drum switch 44. A second pair of brushes 63 and 64 is provided in conjunction with the drum switch 62. The brushes 48 and 49, associated with the drum switch 44, and the brushes 63 and 64, associated with the drum switch 62, are connected to the grids 51 and 52 of the start and cut-off tubes 31 and 41 by means of a ratchet relay, shown generally at 65.

The ratchet relay 65 comprises a drum having segments 66, 67, 68 and 69 which are connected, respectively, to brushes 63, 48, 64 and 49, as illustrated, by suitable conductors. Each of the segments 66 through 69 are respectively provided with sections 70 through 73 which are positioned in the paths of brushes 75 and 76. Thus, when the drum of the ratchet relay 65 is rotated, the brushes 75 and 76 are caused to engage either the sections 71 and 73 or the sections 70 and 72 to engage the corresponding brushes, of the drum switch 44 or of the drum switch 62, depending upon the position of the ratchet relay 65.

In order to rotate the drum of the ratchet relay 65, a ratchet wheel 77 is provided with which a pivotally mounted spring biased pawl 78 is arranged to engage, as shown. The pawl 78 is operated by means of an armature 79 and a winding 80 which may be connected to the conductors 14 and 15 by means of the control switch 57, as will be readily understood. It will be observed that, on energization of the winding 80, the armature 79 will be moved to the left, thereby causing the pawl 78 to engage one of the teeth of the ratchet wheel 77. On de-energization of the winding 80, the pawl 78 will be moved to the right and the drum of the ratchet relay 65 will thus be rotated to cause the brushes 75 and 76 to engage the sections 70 and 72, respectively.

In order to prevent the operation of the system immediately after the switches 17 are closed, so that the cathodes of the tubes 24, 25, 31 and 41 will be given an opportunity to become heated to operating temperature, a time delay relay 81 is provided in the anode circuit of the start tube 31, as illustrated. The relay 81 is arranged to be energized from the conductors 14 and 15, as soon as the switches 17 are operated to the closed position. The time delay relay 81 may be of any suitable type which will permit a predetermined time to elapse before its contact members are closed. While a relay of the dash-pot type is illustrated in the drawings, it will be readily apparent that any other suitable type of time delay relay may be used.

In the embodiment of the invention illustrated in Fig. 2 of the drawings, the battery 34, shown in Fig. 1, for applying a negative potential to the grids 32 and 33 of the control tubes 24 and 25 is omitted and this potential is obtained directly from the variable resistor 54. In addition, the batteries 36 and 53 are omitted and a transformer 82 is used which is arranged to provide suitable direct current potential for operating the system through rectifying devices 83 and 84 of the well known copper oxide type. Suitable capacitors 85, 86 and 87 are provided across the secondary winding of the transformer 82 in order to smooth out the ripples in the direct current which is obtained therefrom through the rectifiers 83 and 84.

In operation, after the switches 17 are closed, the time delay relay 81 is energized and, after the time for which it has been set has elapsed, its contact members are closed thereby setting up the control circuit for operation. After the work has been properly positioned between the welding electrodes 13, the operator depresses the control switch 57, thereby energizing the control relay 58 to apply positive potential to the anode of the start tube 31. At the same time, the winding 80 is energized to effect the operation of the ratchet relay 65 on de-energization of the winding 80, as has been previously described.

The vapor-electric devices 18 and 19 will then be caused to function, as hereinbefore set forth, and their time of operation will depend upon the position of the brush 48 with reference to the time at which the section 47 is caused to engage it and also the time that is necessary for the section 47 to engage the brush 49, as has also been set forth hereinbefore. The operator then releases the control switch 57 and adjusts the position of the work between the electrodes 13.

For the succeeding welding operation, the operator again closes the control switch 57. Because of the previous operation of the ratchet relay 65 the sections 70 and 72 of the segments 66 and 68 now respectively engage the brushes 75 and 76, thereby connecting the grids 51 and 52 to the brushes 63 and 64, respectively, that are associated with the drum switch 62. The brush 63 may be positioned exactly 180 electrical degrees away from the brush 48 so that for each succeeding welding operation the succeeding positive or negative cycle of current will be first applied to the welding transformer 10 rather than to apply continuously either a positive or negative half cycle at the initiation of the welding operation.

The operation of the system under the control of the drum switch 62 is identical with that under the control of the drum switch 44 and, therefore, the description thereof will not be repeated.

While the start brushes 48 and 63 have been described as being positioned 180 electrical degrees apart, it will be apparent that they may be differently spaced so that alternate welds will be of a shorter or longer duration than the remaining welds. Thus, a relatively small amount of energy may be applied followed by the application of a large amount of energy either at the same spot on the work or at successive spots as in seam welding. It will also be apparent that, by properly spacing the start brushes 48 and 63, advantage may be taken of the unsymmetrical current loops resulting in the wave form of the load current caused by the out-of-phase relation of the current and voltage in the circuit, to obtain unequal heating for successive welding operations.

Figure 3:
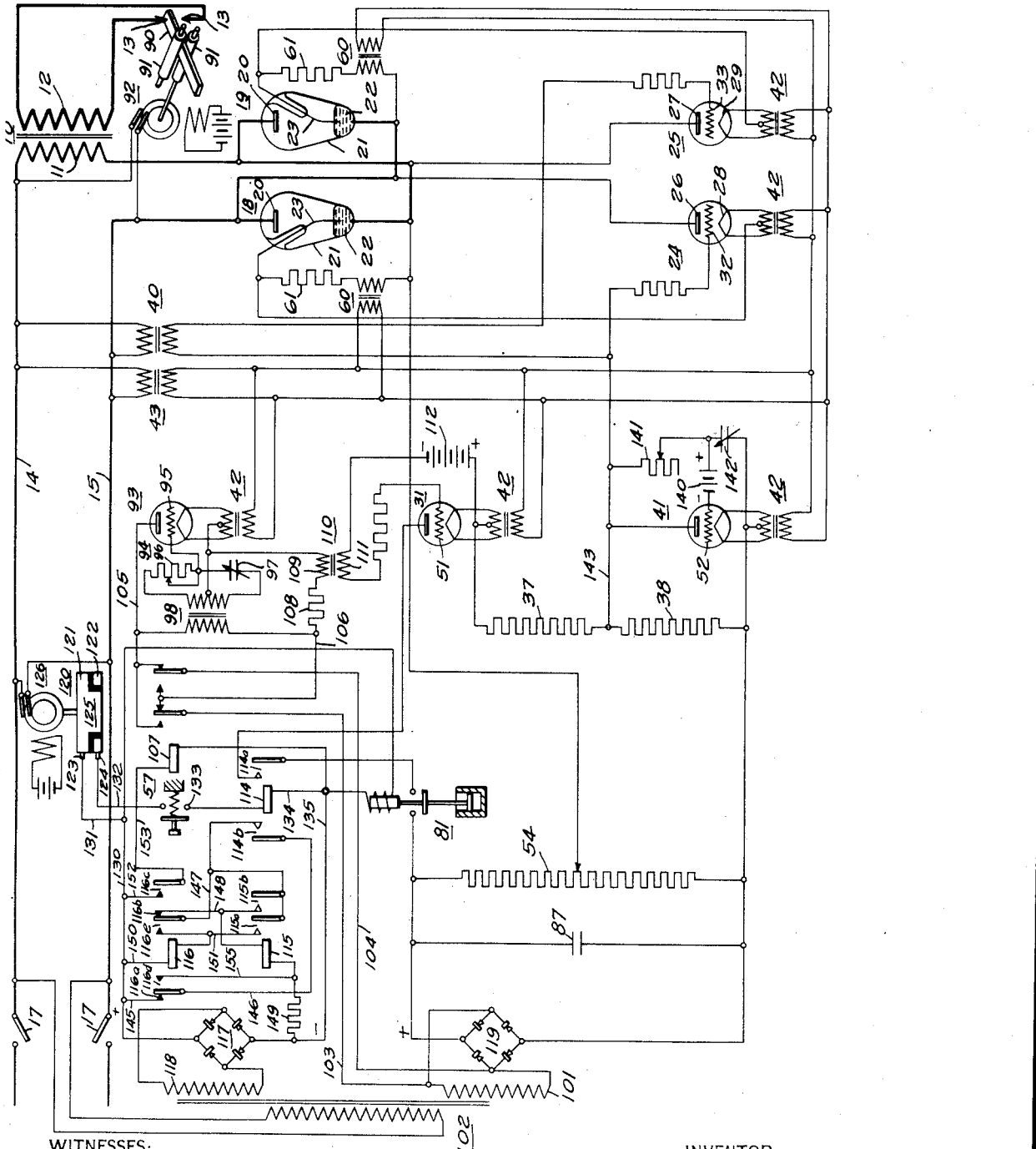

Referring now to Fig. 3 of the drawings, it will be observed that the welding system there shown, corresponds generally to the systems shown in Figs. 1 and 2 of the drawings. In this embodiment of the invention, it will be observed that work 90 is arranged to be fed between the electrodes 13 by means of feed rollers 91 which are driven by means of a synchronous motor 92 that is energized from the conductors 14 and 15.

As illustrated in the drawings, the work 90 may comprise two thin strips along which a series of spot welds are to be formed. However, it will be apparent that this type of work is merely illustrative of that which is capable of being performed by welding apparatus constructed in accordance with this invention and that many other shapes of work may be welded thereby.

It will also be apparent that any other suitable type of feeding device may be used for feeding the work 90 between the welding electrodes 13, such as a device which, in place of feeding it continuously, as illustrated in the drawings, will feed it in steps in the manner of a ratchet or step-by-step feed.

In the embodiment of the invention illustrated in Fig. 3 of the drawings, the operation of the start tube 31 is controlled by means of a timing tube 93 rather than by the synchronous motor 50 and the drum switch 44, as illustrated in Figs. 1 and 2 of the drawings. The timing tube 93 is of the hot cathode type and is provided with a phase shifting control circuit 94 for the grid 95, which comprises an adjustable resistor 96 and an adjustable capacitor 97. The phase shifting circuit 94 is connected by means of a transformer 98 to the same source of alternating current as is applied to the anode and cathode of the timing tube 93. Alternating current for the timing tube 93 is provided from a winding 101 on a multiwinding transformer 102 over conductors 103 and 104 to conductors 105 and 106. A reversing relay 107 is provided for interchanging the connections of the conductors 105 and 106 to the conductors 103 and 104 the operation of which will be hereinafter set forth.

The output of the timing tube 93 is applied to a circuit comprising a resistor 108 and a winding 109 of a transformer 110 which is provided with a readily saturable core. The secondary winding 111 of the transformer 110 is connected to the grid 51 of the start tube 31 through a battery 112, which normally applies a negative potential to the grid 51.

The reversing relay 107 is provided to interchange the connections of the alternating current source to the timing tube so that the functioning of the vapor-electric devices 18 and 19 may be started on alternate positive and negative half cycles for the purpose set forth hereinbefore. In order to control the operation of the reversing relay 107, a relay chain comprising a control relay 114 and relays 115 and 116 is provided.

Energy for operating the relays is provided by means of a full-wave rectifier 117, of the copper oxide type, which may be connected to a winding 118 of the transformer 102. A similar rectifier 119 is connected to the winding 101 to provide a suitable direct-current potential for operating the start and cut-off tubes 31 and 41, as well as to supply the necessary potential for operating the control tubes 24 and 25.

In order to render the entire welding system automatic on operation of the control switch 57, a drum switch 120 is provided having segments 121 and 122 which are arranged to engage brushes 123 and 124. The segment 121 is provided with a section 125 that is arranged to bridge both of the brushes 123 and 124 to complete the circuit to the control switch 57. The drum switch 120 is arranged to be driven by means of a synchronous motor 126 which is energized from the conductors 14 and 15. With this arrangement, it will be observed that the time of the application of current to the work 90 for performing the welding operation is synchronized with the rate at which the work is fed between the electrodes 13. In this manner the entire control of the system is removed from the judgment of the operator and it is only necessary for him to operate the control switch 57 and the remaining functions will be automatically performed. With this system of control it will be apparent that a predetermined number of cycles may be passed and then for a predetermined number of cycles no energy will be passed. This exact control of the application of welding energy may be varied by differently proportioning the segments of the drum switch 120.

While, for purposes of illustration, two synchronous motors 92 and 126 are shown for feeding the work 90 and controlling the operation of the control relay 114, it will be readily apparent that both the feeding rollers 91 and the drum switch 120 may be driven from a common mechanical drive mechanism and that it need not necessarily be energized from the conductors 14 and 15.

In operation, the switches 17 are closed, thereby energizing the synchronous motors 92 and 126 and also the cathodes of the various tubes which are used in the control system. After the predetermined time has elapsed for which the time delay relay 81 is adjusted, its contact members will be closed and the system will be in condition for operation. The work 90 having been positioned between the rollers 91 and fed between the electrodes 13, the operator closes the control switch 57 and the control relay 114 is energized.

The circuit for energizing control relay 114 may be traced from the positively energized conductor 130 through conductor 131, contact segment 121, conductor 132, contact members 133 of the control switch 57, winding of relay 114, conductor 134 to the negatively energized conductor 135.

The energization of control relay 114 causes contacts 114a to close, thereby completing an obvious circuit to the anode of the start tube 31. The system is then placed under the control of the timing tube 93.

Figure 5:
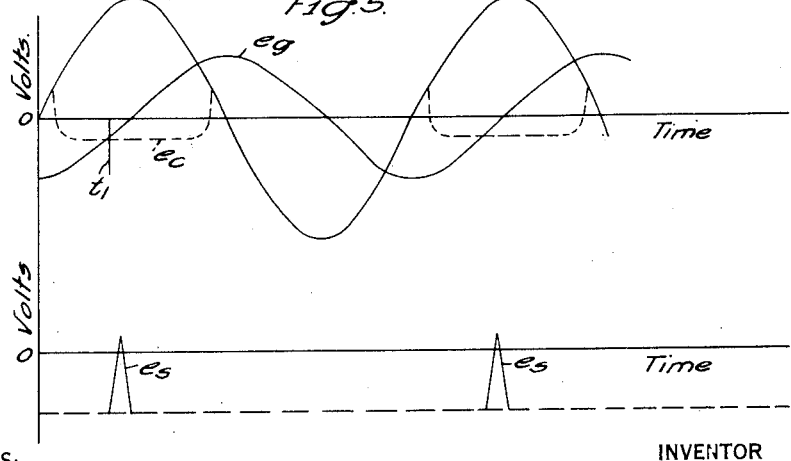
Fig. 5 shows a number of curves which demonstrate the characteristics possessed by the control system illustrated in Figs. 3 and 4.

The phase shifting circuit 94 is adjusted by means of the variable resistor 96 and variable capacitor 97 to render the start tube 31 conducting at the desired point in the cycle of operation of the alternating current source. For a more complete understanding of the operation of the phase shifting circuit 94, reference may be had to Fig. 5 of the drawings, in which the curve $e_p$ represents the alternating current voltage that is applied to the anode of the timing tube 93. The curve $e_g$ represents the corresponding voltage that is applied to the grid 95 of the timing tube 93. It will be apparent that by adjusting the resistor 96 and capacitor 97, the relative phase position of the curves $e_p$ and $e_s$ may be altered to obtain any desired relation. The curve $e_c$ represents the critical grid bias which, if exceeded in the positive sense, will cause the timing tube 93 to become ionized or to be rendered conducting.

At the time represented by $t_1$ when the critical grid bias voltage $e_c$ has been exceeded, the timing tube 93 is rendered conducting and permits current to flow through the primary winding 109 of the transformer 110. Due to the fact that the core of the trnasformer 110 is readily saturable, a voltage surge represented by the curve $e_s$ will appear in the secondary winding 111 which will be applied to the grid 51. The peak value of the surge represented by the curve $e_s$ is sufficient to overcome the negative potential of the battery 112 and to positively bias the grid 51, thereby rendering the start tube 31 conducting. It will then be observed that the start tube 31 will be rendered conducting only at a time corresponding to $t_1$ and that the application of positive potential to the anode thereof will not alter this condition except that it must be present at a time corresponding to $t_1$.

As soon as the start tube 31 becomes conducting, a positive potential is applied to the control tubes 24 and 25 and they will then function as set forth hereinbefore.

In order to control the cut-off tube 41 to arrest the further functioning of the control tubes 24 and 25, and, as a result, to render the vapor-electric devices 18 and 19 non-conducting, the grid 52 is provided with a negative bias by means of a battery 140. An adjustable resistor 141 and an adjustable capacitor 142 are connected in series circuit relation across the anode and cathode of the cut-off tube 41, as illustrated. The positive terminal of the battery 140 is connected to the adjustable resistor 141. As long as sufficient negative potential is applied to the grid 52, the cut-off tube 41 is rendered non-conducting.

As soon as start tube 31 is rendered conducting, a positive potential is applied to the conductor 143, as will be readily understood, and the capacitor 142 immediately begins to assume a positive charge through the adjustable resistor 141. The time which must elapse before the capacitor 142 is charged is dependent upon the resistance of the resistor 141 and the capacitance of the capacitor 142.

Due to the continued application of positive potential to the conductor 143, the capacitor 142 will finally assume a positive charge sufficient to overcome the negative bias applied to the grid 52 by the battery 140 and the cut-off tube 41 will be rendered conducting. As has been set forth hereinbefore, the control tubes 24 and 25 will then be rendered non-conducting.

The continued rotation of the drum switch 120 finally causes the control relay 114 to be de-energized and the start and cut-off tubes 31 and 41 are rendered non-conducting after the completion of a single welding operation.

In order to effect the operation of the reversing relay 107 to reverse the connections to the timing tube 93, the circuits involving the operation of relays 115 and 116 will now be described.

On energization of the control relay 114, contact members 114b thereof are closed and a circuit is completed for energizing relay 115.

The circuit for energizing relay 115 may be traced from the positively energized conductor 130 through conductor 145, contact members 116a, conductor 146, contact members 114b, conductor 147, contact members 116b, conductor 148, winding of relay 115 and resistor 149 to the negatively energized conductor 135.

The de-energization of relay 114 permits the energization of relay 116 over a circuit which may be traced from the energized conductor 130 through conductor 150, winding of relay 116, conductor 151, contact members 115a and 115b and in series with winding of relay 115 to the energized conductor 135.

The energization of relay 116 completes a circuit for energizing relay 107 which may be traced from energized conductor 130 through conductor 152, contact members 116c, conductor 153, winding of relay 107 to conductor 135.

The energization of reversing relay 107 causes conductor 103 to be connected to conductor 105 and conductor 104 to become connected to conductor 106 through the contact members of the reversing relay 107, as will be readily understood.

Following the de-energization of control relay 114, relays 115 and 116 will remain energized in series circuit relation and will, therefore, maintain the reversing relay 107 energized.

On a subsequent operation of the control relay 114, the relay 115 will be shunted down over a circuit which may be traced from one terminal of the winding of relay 115 through conductor 155, contact members 116d, conductor 146, contact members 114b, conductor 147, contact members 115b to the other terminal of the winding of the relay 115. The relay 115 is thereupon de-energized and its contact members 115a and 115b are opened.

The relay 116 is maintained energized over a circuit which may be traced from the energized conductor 130 through conductor 150, winding of relay 116, contact members 116e, conductor 147, contact members 114b, conductor 146, contact members 116d, conductor 155 and resistor 149 to conductor 135.

As soon as the control relay 114 is de-energized, the relay 116 is also de-energized and, as a result, the reversing relay 107 is returned to the de-energized position.

As long as the operator maintains the control switch 57 in the closed position, the hereinbefore described operations will be repeated and the timing tube 93 will be alternately energized by the reversing relay 107 in accordance with the setting of the phase shifting circuit 94.

While the relay chain that has been described hereinbefore for controlling the operation of the reversing relay 107 may be used, it will be readily apparent to one skilled in the art that many other circuits may be used for controlling the operation of the reversing relay 107. In addition, it will be also apparent that the reversal of the alternating-current potential, as applied to the conductors 105 and 106, may be accomplished by other well known systems and circuits.

Figure 4:
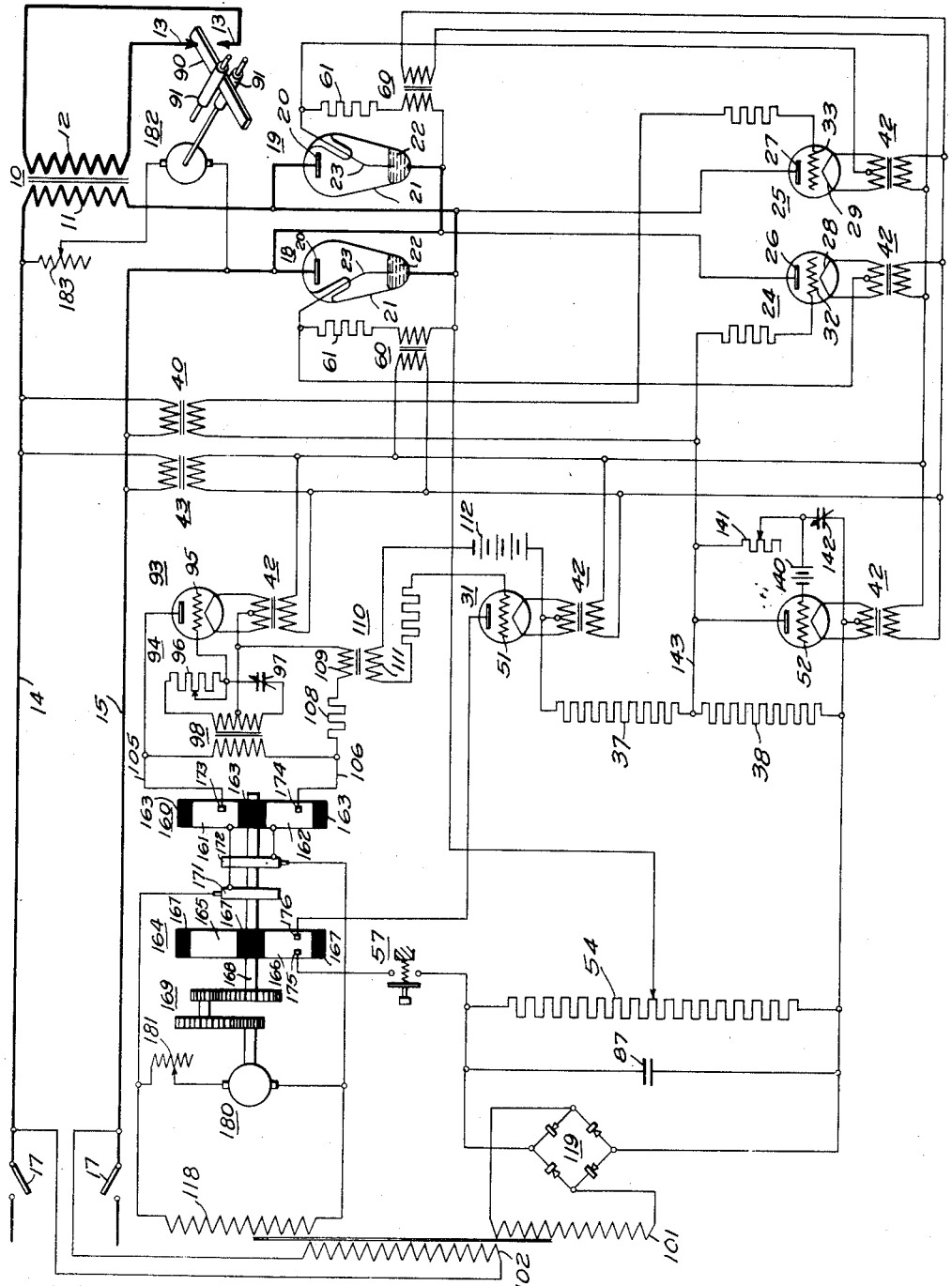

Referring now particularly to Fig. 4 of the drawings, it will be observed in this instance that the reversal of the alternating-current potential, as supplied to the timing tube 93, is accomplished by means of a drum switch 160 which comprises contact segments 161 and 162 spaced apart by means of insulating segments 163.

The control of the circuit connection to the anode of the start tube 31 is effected by means of a second drum switch 164 which comprises contact segments 165 and 166 and insulating segments 167.

The drum switches 160 and 164 are mounted for rotation on a shaft 168 which may be driven by means of suitable reduction gears 169 by any suitable variable speed motor 180 which may be energized, as illustrated, from the secondary winding 118 and the speed of which may be varied by means of a rheostat 181.

In addition the work 90 may be driven by a variable speed motor 182, the speed of which may be altered as desired by means of a rheostat 183.

It will be observed that the alternating current potential from the winding 118 is applied to the contact segments 161 and 162 by means of slip rings 171 and 172 which may be mounted for rotation, in the customary manner, on the shaft 168 and which are connected to the contact segments 161 and 162, respectively. Suitable brushes 173 and 174 are provided for engaging the contact segments 161 and 162, so that the conductors 105 and 106 may be alternately connected to opposite terminals of the winding 118 to apply the alternating current potential to the timing tube 93 for each succeeding operation 180 electrical degrees removed from that at which it was applied for the previous operation for the purpose set forth hereinbefore.

Brushes 175 and 176 are provided in the circuit to the anode of the start tube 31 in order to engage either of the contact segments 165 and 166 to complete the circuit from the direct current source 119 to the anode of the start tube 31, as will be readily apparent. It will be observed that the relative lengths of the contact segments 165 and 166 as compared to the lengths of the insulating segments 167 may be varied as desired so that a predetermined time will elapse between welding operations. In other words, since the drum switch 164 is driven by means of the variable speed motor 180, the drum switch 164 may be so proportioned as to initiate the welding operations successively after a predetermined number of cycles during which welding current has not been passed by the vapor electric devices 18 and 19 and further the time that elapses between the initiation of successive welding operations may be altered as desired by adjusting the rheostat 181.

It will then be apparent that the phase shifting circuit 94 may be adjusted to predetermine the exact time in a particuar half cycle at which the timing tube 93 will become conducting and will, therefore, cause the proper energizing potential to be applied to the grid 51 of the start tube 31 to render it conducting, as has been set forth hereinbefore.

When the start tube 31 is rendered conducting, current flows through the resistors 37 and 38 from the direct current source 119 to apply an energizing potential to the conductor 143 to render the control tubes 24 and 25 conducting, and in turn the vapor-electric devices 18 and 19. At the same time that the start tube 31 is rendered conducting the adjustable capacitor 142 begins to assume a charge depending upon the resistance of the adjustable resistor 141 and the capacitance of the capacitor 142 so that an energizing potential will be applied to the grid 52 of the cut-off tube 41 a predetermined time after the start tube 31 has been rendered conducting. When the cut-off tube 41 is rendered conducting the resistor 38 is short-circuited as the energizing potential is removed from the conductor 143.

It will thus be apparent that the phase shifting circuit 94 may be adjusted to determine the exact time in a half cycle at which the vapor electric devices 18 and 19 will become conducting and the circuit comprising the adjustable resistor 141 and capacitor 142 is effective to determine the interval during which the vapor-electric devices 18 and 19 remain conducting, while the drum switch 164 is effective to determine the number of cycles during which the vapor-electric devices 18 and 19 are not conducting.

In operation, after the switches 17 are closed and the work 90 is fed to the electrodes 13 by means of the rolls 91 driven by the variable speed motor 182 at any desired speed which may be set by the rheostat 183, the operator closes the control switch 57, thereby completing the circuit from the direct-current source 119 to the cathode of the start tube 31 through either the contact segments 165 or 166, depending upon which is in position to bridge the brushes 175 and 176. When the time for which the phase-shifting circuit 94 is adjusted occurs, the timing tube 93 will become conducting to initiate the functioning of the start tube 31 and the control tubes 24 and 25 to render the vapor-electric devices 18 and 19 conducting, as has been set forth in detail hereinbefore.

The continued rotation of the drum switch 164 while the control switch 57 is held closed causes the brushes 175 and 176 to engage the insulating segment 167, thereby opening the circuit to the start tube 31. The time during which this circuit remains open is a function of the time necessary to again bridge the brushes 175 and 176. As has been set forth hereinbefore, this time may be varied by changing the length of the insulating segments 167. It will also be obvious that it may be varied by changing the reduction gearing 169 so that the drum switch 164 may be driven at either a faster or a slower rate, or by changing the adjustment of the rheostat 181.

When the brushes 175 and 176 are again bridged by the contact segment 165, the direct current source 119 will be connected to the anode of the start tube 31 so that it may be rendered conducting, depending upon the operation of the timing tube 93. It will also be observed that the connection to the conductors 105 and 106 from the alternating current source 118 is reversed so that the vapor-electric device 18 or 19 is rendered conducting on a succeeding positive or negative cycle, depending upon whether one or the other of the vapor-electric devices 18 or 19 had previously been rendered conducting on a negative or positive half cycle.

While, for the purposes of illustration, the drum switches 160 and 164 have been illustrated as being driven by means of the variable speed motor 180, it will be readily apparent that they may be driven by means of the motor 182. It will also be apparent that, in some instances, it may not be desirable to use a variable speed motor for controlling the operation of the system and for this purpose any other suitable driving means may be used, as will be readily understood.

While the foregoing control systems have been illustrated and described as particularly adapted for controlling the energy that is supplied for performing welding operations, it will be readily apparent that the various control systems which are disclosed in combination for effecting the functioning of this invention may be used in various other applications. Therefore, since certain further changes may be made in the system set forth hereinbefore and different embodiments of the invention may be made without departing from the scope thereof, it is intended that all matter contained in the above description or shown in the accompanying drawings shall be interpreted as illustrative and not in a limiting sense.

I claim as my invention:

1. In an electric power system, in combination, a load circuit, circuit means connecting the load circuit to a source of alternating current, two unidirectional conducting electronic devices interposed between the load circuit and the current source and connected inversely for controlling and conducting the entire flow of current to the load circuit at a maximum in half cycle periods, a control tube individual to each of the devices for rendering them conducting, control means common to the control tubes and operable in accordance with the frequency of the alternating current for controlling the operation of the control tubes, and means for actuating said control means, said control means when actuated causing said control tubes to function to render said electronic devices conducting for a predetermined number of half cycles only.

2. In an electric power system, in combination, a load circuit, circuit means connecting the load circuit to a source of alternating current, two unidirectional conducting electronic devices interposed between the load circuit and the current source and connected inversely for preventing the flow of current to the load circuit, a control tube individual to each of the devices for rendering them conducting at a maximum in half cycle periods, control means common to the control tubes for initiating the functioning of the control tubes, and additional control means for terminating the functioning of the control tubes, said first-named and said last-named control means being operable in accordance with the frequency of the alternating current supplied from said source.

3. In an electric power system, in combination, a load circuit, circuit means connecting the load circuit to a source of alternating current, two unidirectional conducting electronic devices interposed between the load circuit and the current source and connected inversely for controlling the flow of current to the load circuit, control means connected to the devices and synchronized with the alternating current source to render the electronic devices conducting at a maximum in half cycle periods, said control means including means to restrict the interval during which said electronic devices are conductive to a predetermined number of half cycles of the alternating current, and means for initiating the functioning of the electronic devices during alternate positive and negative half cycles of the alternating current.

4. In an electric power system, in combination, a load circuit, circuit means connecting the load circuit to a source of alternating current, two unidirectional conducting electronic devices interposed between the load circuit and the current source and connected inversely for controlling the flow of current to the load circuit, a control tube individual to each of the electronic devices for rendering them conducting at a maximum in half cycle periods, operating means common to the control tubes and operable in accordance with the frequency of the alternating current source for initiating the operation of the control tubes, and means for controlling the action of the operating means to alternately initiate the functioning of the electronic devices with positive and negative half cycles of the alternating current.

5. In an electric power system in combination, a load circuit, circuit means connecting the load circuit to a source of alternating current, vapor-electric conducting means interposed in the circuit means for controlling and conducting the entire flow of current to the circuit at a maximum in half cycle periods and control means in the vapor-electric means for igniting the vapor thereof to render said vapor-electric means conducting for half cycle or less intervals, said control means including means for interrupting the conductivity of said vapor electric means after it has been conductive during a predetermined number of half cycles.

6. In a control system, in combination, a first space-discharge device interposed between a current source and a load for controlling the flow of current to the load, a control electrode in the first space-discharge device, a source of direct current, a second space-discharge device connected to one point of the source of direct current, a control electrode in the second space-discharge device, a resistor connected in series circuit relation with the second space-discharge device and to another point of the source of direct current, circuit means connecting a point along the resistor to the first-named control electrode, a drum switch provided with a contact segment, circuit means connecting the contact segment to the source of direct current, a brush connected to the second-named control electrode and disposed in the path of the contact segment, means for rotating the drum switch relative to the brush to effect the engagement of the contact segment with the brush to apply an energizing potential to the second-named control electrode thereby rendering the second space-discharge device conducting to permit current to flow through the resistor, to apply an energizing potential to the first-named control electrode to render the first space-discharge device conducting, a third space-discharge device connected to the resistor and to said other terminal of the source of direct current, a control electrode in the third space-discharge device, a second brush connected to the third-named control electrode and disposed in the path of the contact segment to apply an energizing potential to the third-named control electrode thereby rendering the third space-discharge device conducting to effect the removal of the energizing potential from the first-named control electrode to render the first space-discharge device non-conducting.

7. In a control system, in combination, a first space-discharge device interposed between a current source and a load for controlling the flow of current to the load, a control electrode in the first space-discharge device, a source of direct current, a second space-discharge device connected to a point of the source of direct current, a control electrode in the second space-discharge device, a resistor connected in series circuit relation with the second space-discharge device and to another point of the source of direct current, circuit means connecting a point along the resistor to the first-named control electrode, a third space-discharge device, circuit means connecting the third space-discharge device to the second-named control electrode, means for rendering the third space-discharge device conducting at predetermined spaced intervals to apply an energizing potential to the second-named control electrode, thereby rendering the second space-discharge device conducting to permit current to flow through said resistor and thereby applying an energizing potential to the first-named control electrode to render the first space-discharge device conducting, a fourth space-discharge device connected to the resistor and to said other point of the source of direct current, a control electrode in the fourth space-discharge device, circuit means connecting the third-named control electrode to the resistor to permit the application of an energizing potential to the third-named control electrode to render the fourth space-discharge device conducting thereby effecting the removal of the energizing potential from the first-named control electrode to render the first space-discharge device non-conducting.

8. In a control system, in combination, a source of alternating current, a load, circuit means connecting the source of alternating current to the load, a pair of inversely connected space-discharge devices interposed between the source of alternating current and the load for controlling the flow of current to the load, a control electrode in each of said space-discharge devices, a transformer having a primary winding connected to the source of alternating current and a single secondary winding connected between the control electrodes in said space-discharge devices, circuit means for applying an energizing potential to the grids to render said space-discharge devices conducting, and a cut-off space-discharge device connected to the circuit means for effecting the removal of the energizing potential from the control electrodes to render the pair of space-discharge devices non-conducting.

9. In a control system, in combination, a source of alternating current, a load, circuit means connecting the source of alternating current to the load, a pair of space-discharge devices each provided with an anode, a cathode and a grid and connected inversely in the circuit means for preventing the flow of current to the load, a transformer having a primary winding connected to the alternating current source and a secondary winding connected in series with said grids and means connected between one of said grids and said secondary for supplying a common grid bias for the space-discharge devices.

10. In a control system, in combination, a source of direct current, a first space-discharge device connected to one point of the source of direct current, a control electrode in the first space-discharge device, a resistor connected in series circuit relation with the first space-discharge device and to another point of the source of direct current, a pair of conductors connected to the resistor at different points, a second space-discharge device connected in shunt circuit relation with the resistor, a control electrode in the second space-discharge device, circuit means effective to apply an energizing potential to the first-named control electrode to render the first space-discharge device conducting thereby applying potential from the source of direct current to the pair of conductors, and additional circuit means effective to apply an energizing potential to the second-named control electrode to render the second space-discharge device conducting thereby changing the potential applied to the pair of conductors.

11. In a control system, in combination, a source of direct current, a first space-discharge device connected to one point of the source of direct current, a control electrode in the first space-discharge device, a resistor connected in series circuit relation with the first space-discharge device and to another point of the source of direct current, a pair of conductors connected to the resistor at different points, a second space-discharge device, a source of alternating current, circuit means connecting the source of alternating current to the second space-discharge device, a saturable transformer having a primary winding connected in series circuit relation with the second space-discharge device and a secondary winding connected to the first-named control electrode, a control electrode in the second space-discharge device, phase-shifting means connecting the second-named control electrode to the source of alternating current to apply an energizing potential to the second-named control electrode for rendering the second space-discharge device conducting to cause current to flow in the primary winding of the saturable transformer and a potential impulse to appear in the secondary winding and on the first-named control electrode to render the first space-discharge device conducting thereby applying potential from the source of direct current to the pair of conductors, a third space-discharge device connected in shunt circuit relation with the resistor, an adjustable resistor and an adjustable capacitor connected in series circuit relation and in shunt circuit with the third space-discharge device, and a control electrode in the third space-discharge device connected to the common terminal of the adjustable resistor and adjustable capacitor, said third-named control electrode having an energizing potential applied thereto a predetermined time after the first space-discharge device is rendered conducting depending upon the setting of the adjustable resistor and capacitor to render the third space-discharge device conducting thereby changing the potential applied to the pair of conductors.

12. In a control system, in combination, a first space-discharge device, a saturable transformer having a primary winding connected in series circuit relation with the first space-discharge device, circuit means for connecting a source of current to the first space-discharge device and to the primary winding, a second space-discharge device, a control electrode in the second space-discharge device connected to a secondary winding of the transformer, and means for rendering the first space-discharge device conducting to cause current to flow in the primary winding and a potential impulse to appear in the secondary winding and on the control electrode to render the second space-discharge device conducting.

13. In a control system, in combination, a source of direct current, a resistor, circuit means for effecting the connection of the resistor to the source of direct current, a space-discharge device connected in shunt circuit relation with a portion of said resistor, a control electrode in the space-discharge device, and circuit means for effecting the energization of the control electrode to render the space-discharge device conducting a predetermined time after the initiation of current flow in said resistor.

14. In a control system, in combination, a first space-discharge device, a saturable transformer having a primary winding connected in series circuit relation with the first space-discharge device, circuit means for connecting a source of current to the first space-discharge device and to the primary winding, a source of direct current, a second space-discharge device and a resistor connected in series circuit relation and to the source of direct current, a control electrode in the second space-discharge device connected to the secondary winding of the transformer, a third space-discharge device connected in shunt circuit relation with a portion of said resistor, a control electrode in the third space-discharge device, circuit means for effecting the energization of the second-named control electrode to render the third space-discharge device conducting a predetermined time after the initiation of current flow in said resistor, and means for rendering the first space-discharge device conducting to cause current to flow in the primary winding and a potential impulse to appear in the secondary winding and on the first-named control electrode to render the second space-discharge device conducting.

15. In a control system, in combination, a first space-discharge device, a control electrode in the first space-discharge device, a saturable transformer having a primary winding connected in series circuit relation with the first space-discharge device, a source of alternating current connected to the first space-discharge device and to the primary winding, a second space-discharge device, a control electrode in the second space-discharge device connected to a secondary winding on the saturable transformer, and adjustable phase-shifting means connecting the first-named control electrode to the source of alternating current to apply an energizing potential to the first-named control electrode to render the first space-discharge device conducting at a predetermined point in a cycle of the alternating current thereby causing current to flow in the primary winding and an energizing potential to appear in the secondary winding and on the second-named control electrode.

16. In electric power apparatus, in combination, a load circuit, circuit means connecting the load circuit to a source of alternating current, electronic means interposed in the circuit means for controlling the flow of load current, and control means for rendering the electronic means conducting at a maximum in half cycle periods beginning on alternate half cycles of the alternating current and non-conducting for a predetermined number of half cycles.

17. In electric power apparatus, in combination, a load circuit, circuit means connecting the load circuit to a source of alternating current, electronic means interposed in the circuit means for controlling the flow of load current, control means for rendering the electronic means conducting for a predetermined number of half cycles of the alternating current at a maximum in half cycle periods, and means for initiating the functioning of the control means at spaced intervals beginning on alternate half cycles.

18. In electric power apparatus, in combination, a load circuit, circuit means connecting the load circuit to a source of alternating current, electronic means interposed in the circuit means for controlling the flow of load current, start means connected to control the electronic means for rendering the electronic means conducting at a maximum in half cycle periods at a predetermined point in a cycle of the alternating current, cut-off means connected to control the electronic means for rendering the electronic means non-conducting a predetermined time after being rendered conducting, control means for initiating and terminating the functioning of the start means, additional control means for initiating the operation of the start means on alternate half cycles of the alternating current, and means for continuously operating said control means at a predetermined rate.

19. In an electric power system, in combination, a load circuit, circuit means connecting the load circuit to a source of alternating current, two unidirectional conducting electronic devices interposed between the load circuit and the current source and connected inversely for preventing the flow of current to the load circuit, a control tube individual to each of the vapor electric devices for rendering them conducting at a maximum in half cycle periods, operating means common to the control tubes and operable in accordance with the frequency of the alternating current source for initiating the operation of the control tubes, means for adjusting said operating means to render one of the electronic devices conducting during a predetermined portion of the cycle of operation of the alternating current source, and means for controlling the action of the operating means to alternately initiate the functioning of the electronic devices with positive and negative half cycles of the alternating current.

20. In a control system, in combination, a first space discharge device interposed between a current source and a load for preventing the flow of current to the load, a control electrode in the first space discharge device, a source of direct current, a second space discharge device connected to one terminal of the source of direct current, a resistor connected in series circuit relation with the second space discharge device and to the other terminal of the source of direct current, circuit means connecting a point along the resistor to said grid, means for rendering the second space discharge device conducting at a predetermined time to permit current to flow through said resistor thereby applying an energizing potential to said control electrode to render said first space discharge device conducting, a third space discharge device connected to the resistor and to said other terminal of the source of direct current, and means for rendering the third space discharge device conducting a predetermined interval of time after the second space discharge device is rendered conducting to effect the removal of the energizing potential from said control electrode to render the first space discharge device non-conducting.

21. In a control system, in combination, a first space discharge device interposed between a current source and a load for preventing the flow of current to the load, a control electrode in the first space discharge device, a source of direct current, a second space discharge device connected to one point of the source of direct current, a control electrode in the second space discharge device, a resistor connected in series circuit relation with the second space discharge device and to another point of the source of direct current, circuit means connecting a point along the resistor to the first-named control electrode, a drum switch provided with a contact segment, circuit means connecting the contact segment to the source of direct current, a brush connected to the second-named control electrode and disposed in the path of the contact segment, means for rotating the drum switch relative to the brush at a substantially constant speed to effect the engagement of the contact segment with the brush to apply an energizing potential to the second-named control electrode thereby rendering the second space discharge device conducting to permit current to flow through the resistor, thereby applying an energizing potential to the first-named control electrode to render the first space discharge device conducting, a third space discharge device connected to the resistor and to said other terminal of the source of direct current, a control electrode in the third space discharge device, a second brush connected to the third-named control electrode and disposed in the path of the contact segment to apply an energizing potential to the third-named control electrode a predetermined interval of time after the second space discharge device is rendered conducting, thereby rendering the third space discharge device conducting to effect the removal of the energizing potential from the first-named control electrode to render the first space discharge device non-conducting.

22. In a control system, in combination, a first space discharge device interposed between a current source and a load for preventing the flow of current to the load, a control electrode in the first space discharge device, a source of direct current, a second space discharge device connected to one point of the source of direct current, a control electrode in the second space discharge device, a resistor connected in series circuit relation with the second space discharge device and to another point of the source of direct current, circuit means connecting a point along the resistor to the first-named control electrode, a third space discharge device, a source of alternating current, circuit means connecting the source of alternating current to the third space discharge device, a saturable transformer having a primary winding connected in series circuit relation with the third space discharge device and a secondary winding connected to the second-named control electrode, a control electrode in the third space discharge device, phase shifting means connecting the third-named control electrode to the source of alternating current to apply an energizing potential to the third-named control electrode for rendering the third space discharge device conducting and thereby applying an energizing potential to the second-named control electrode to render the second space discharge device conducting to permit current to flow in the resistor and thereby apply an energizing potential to the first-named control electrode to render the first space discharge device conducting, a fourth space discharge device connected to the resistor and to said other terminal of the source of direct current, an adjustable resistor and an adjustable capacitor connected in series circuit relation and in shunt circuit relation to the fourth space discharge device, and a control electrode in the fourth space discharge device connected to the common terminal of the adjustable resistor and adjustable capacitor, said fourth-named control electrode having an energizing potential applied thereto a predetermined time after the second space discharge device is rendered conducting depending upon the setting of the adjustable resistor and capacitor to render the fourth space discharge device conducting to effect the removal of the energizing potential from the first-named control electrode to render the first space discharge device non-conducting.

23. In a control system, in combination, a source of alternating current, a load, circuit means connecting the source of alternating current to the load, a pair of inversely connected space discharge devices interposed between the source of alternating current and the load for preventing the flow of current to the load, a control electrode in each of said space discharge devices, a source of direct current, a start space discharge device connected to said control electrodes and to the source of direct current for applying energizing potential to said control electrodes to render the pair of space discharge devices conducting, and a cut-off space discharge device connected to said control electrodes for effecting the removal of the energizing potential therefrom to render the pair of space discharge devices non-conducting.

24. In a control system, in combination, a source of alternating current, a load, circuit means connecting the source of alternating current to the load, a pair of inversely connected space discharge devices interposed between the source of alternating current and the load for preventing the flow of current to the load, a control electrode in each of said space discharge devices, a transformer having a primary winding connected to the source of alternating current and a secondary winding connected to the control electrodes in said space discharge devices, a source of direct current, a start space discharge device connected to said control electrodes and to the source of direct current for applying energizing potential to said control electrodes to render the pair of space discharge devices conducting, and a cut-off space discharge device connected to said control electrodes for effecting the removal of the energizing potential therefrom to render the pair of space discharge devices non-conducting.

25. In a control system, in combination, a source of direct current, a first space discharge device connected to one point of the source of direct current, a control electrode in the first space discharge device, a resistor connected in series circuit relation with the first space discharge device and to another point of the source of direct current, a pair of conductors connected to the resistor at different points, a second space discharge device connected in shunt circuit relation with the resistor, a control electrode in the second space discharge device, a drum switch provided with a contact segment, circuit means connecting the contact segments to the source of direct current, a brush connected to the first-named control electrode and disposed in the path of the contact segment, means for rotating the drum switch relative to said brush to effect the engagement of the contact segment with the brush to apply an energizing potential to the first-named control electrode thereby rendering the first space discharge device conducting to apply potential from the source of direct current to the pair of conductors, a second brush connected to the second-named control electrode and disposed in the path of the contact segment to apply an energizing potential to the second-named control electrode thereby rendering the second space discharge device conducting to change the potential applied to the pair of conductors.

26. In a control system, in combination, a source of direct current, a first space discharge device connected to one point of the source of direct current, a control electrode in the first space discharge device, a resistor connected in series circuit relation with the first space discharge device and to another point of the source of direct current, a pair of conductors connected to the resistor at different points, a second space discharge device connected in shunt circuit relation with the resistor, a control electrode in the second space discharge device, a drum switch provided with a contact segment, circuit means connecting the contact segment to the source of direct current, a brush connected to the first-named control electrode and disposed in the path of the contact segment, means for rotating the drum switch relative to said brush at a substantially constant speed to effect the engagement of the contact segment with the brush to apply an energizing potential to the first-named control electrode thereby rendering the first space discharge device conducting to apply potential from the source of direct current to the pair of conductors, a second brush connected to the second-named control electrode and disposed in the path of the contact segment to apply an energizing potential to the second-named control electrode a predetermined interval of time after the first space discharge device is rendered conducting, thereby rendering the second space discharge device conducting to change the potential applied to the pair of conductors.

27. In a control system, in combination, a source of direct current, a first space discharge device connected to one point of the source of direct current, a control electrode in the first space discharge device, a resistor connected in series circuit relation with the first space discharge device and to another point of the source of direct current, a pair of conductors connected to the resistor at different points, a second space discharge device connected in shunt circuit relation with the resistor, a control electrode in the second space discharge device, a first drum switch provided with a first contact segment, a first brush disposed in the path of the first contact segment, a second drum switch provided with a second contact segment, a second brush disposed in the path of the second contact segment, means for rotating the drum switches relative to the brushes to effect the engagement of the brushes with the contact segments at different times, circuit means connecting the contact segments to the source of direct current, relay means connected to the first-named control electrode and to the first and second brushes for alternately connecting the first and second brushes to the first-named control electrode to apply an energizing potential at different times to the first-named control electrode thereby rendering the first space discharge device conducting to apply potential from the source of direct current to the conductors, a third brush disposed in the path of the first contact segment, a fourth brush disposed in the path of the second contact segment, relay means connected to the second-named control electrode and to the third and fourth brushes for alternately connecting the third and fourth brushes to the second-named control electrode to apply an energizing potential at different times to the second-named control electrode thereby rendering the second discharge device conducting to change the potential applied to the pair of conductors.

28. In a control system, in combination, a source of direct current, a first space discharge device connected to one point of the source of direct current, a control electrode in the first space discharge device, a resistor connected in series circuit relation with the first space discharge device and to another point of the source of direct current, a pair of conductors connected to the resistor at different points, a second space discharge device connected in shunt circuit relation with the resistor, a control electrode in the second space discharge device, a first drum switch provided with a first contact segment, a first brush disposed in the path of the first contact segment, a second drum switch provided with a second contact segment, a second brush disposed in the path of the second contact segment, means for rotating the drum switches relative to the brushes at a substantially constant speed to effect the engagement of the brushes with the contact segments at different times, circuit means connecting the contact segments to the source of direct current, relay means connected to the first-named control electrode and to the first and second brushes for alternately connecting the first and second brushes to the first-named control electrode to apply an energizing potential at different times to the first-named control electrode thereby rendering the first space discharge device conducting to apply potential from the source of direct current to the conductors, a third brush disposed in the path of the first contact segment, a fourth brush disposed in the path of the second contact segment, relay means connected to the second-named control electrode and to the third and fourth brushes for alternately connecting the third and fourth brushes to the second-named control electrode to apply an energizing potential at different times to the second-named control electrode, a predetermined interval of time after the first space discharge device is rendered conducting, thereby rendering the second discharge device conducting to change the potential applied to the pair of conductors.

29. In a control system, in combination, a source of direct current, a resistor, circuit means for effecting the connection of the resistor to the source of direct current, a space discharge device connected in shunt circuit relation with a portion of said resistor, a resistor and a capacitor connected in series circuit relation and in shunt circuit relation to the space discharge device, a control electrode in the space discharge device connected to the common terminal of the last-named resistor and the capacitor and having an energizing potential applied thereto to render the space discharge device conducting a predetermined time after the initiation of current flow in the first-named resistor.

30. In an electric power system, in combination, a source of alternating current, a load circuit, circuit means connecting the source of alternating current to the load circuit, electronic means connected in series circuit relation with said circuit means for conducting the entire flow of load current, and control means connected to the electronic means for rendering the electronic means conducting at a maximum in half cycle periods during predetermined intervals and for maintaining said electronic means non-conductive during intermediate intervals.

31. In an electric power system, in combination, a source of alternating current, a load circuit, circuit means connecting the source of alternating current to the load circuit, electronic means connected in series circuit relation with said circuit means for conducting the entire flow of load current at a maximum in half cycle periods, and control means connected to the electronic means and operable in synchronism with the source of alternating current for rendering the electronic means conducting during a predetermined portion of the cycle of operation of the alternating-current source.

32. In an electric power system, in combination, a source of alternating current, a load circuit, circuit means connecting the source of alternating current to the load circuit, electronic means connected in series circuit relation with said circuit means for conducting the entire flow of load current at a maximum in half cycle periods, control means for rendering the electronic means conducting for a predetermined number of half cycles of the alternating current, means for initiating the functioning of the control means at spaced intervals, and means for varying the length of said intervals.

33. Apparatus according to claim 1 characterized by the fact that the actuating means is of the type capable of operation by a single impulse and that the control means is of the type that when once actuated by the actuating means causes the control tubes to function to render the electronic device conducting for the predetermined number of half cycles regardless of whether or not the actuating means continues to be operated.

34. Apparatus for supplying power to a load that requires pulses of current each of which is precisely of a predetermined magnitude comprising a source of alternating current, circuit means connecting said source to said load, electric discharge means interposed in said circuit means for conducting the entire flow of current through said circuit, said discharge means when deenergized functioning as an insulating gap in said circuit means, and means for energizing said discharge means, maintaining said discharge means energized for an interval of time such that a pulse of current of said predetermined magnitude is supplied to said load and thereafter deenergizing said discharge means.

35. Apparatus for supplying power to a load that requires pulses of current each of which is precisely of a predetermined magnitude comprising a source of alternating current, circuit means connecting said source to said load, electric discharge means interposed in said circuit means for conducting the entire flow of current through said circuit, said discharge means when deenergized functioning as an insulating gap in said circuit means, means for energizing said discharge means and means to be manually operated from a non-functioning to a functioning position for initiating the operation of said energizing means, said energizing means including means for maintaining said discharge means energized, after said manual means has been once operated, for an interval of time such that a pulse of current of said predetermined magnitude is delivered to said load and for thereafter maintaining said discharge means deenergized even if said manually operative means is reverted to said non-functioning position prior to the termination of said interval of time or is maintained in said functioning position after the termination of said interval of time.

36. Apparatus for supplying power to a load that requires pulses of current each of which is precisely of a predetermined magnitude comprising a source of current, circuit means connecting said source to said load, means in said circuit means for conducting the flow of current through said circuit, said conducting means being normally inactive to conduct said current and means for actuating said conducting means to conduct current, said conducting means including means whereby it is maintained in conductive condition for an interval of time such that a pulse of current of said predetermined magnitude is delivered to said load and is thereafter rendered non-conductive.

37. In a control system, in combination, a source of alternating current, a load, circuit means connecting the source of alternating current to the load, a pair of electric discharge devices each provided with an anode, a cathode and a control electrode, means for connecting the anode of one discharge device and the cathode of another to one terminal of said source, means for connecting the cathode of the first discharge device and the anode of the other discharge device to the other terminal of said source, means for connecting said control electrodes to each other, control potential supply means, and means for connecting one terminal of said control potential supply means to the connection between said control electrodes and the other terminal to the cathode of said first discharge device directly and to the cathode of said other discharge device through said source, said connecting means for said control electrodes including means for interposing a potential substantially equal to the potential of said source for compensating for the connection of the control potential supply means to the cathode of said other discharge device.

38. In combination, a discharge device having a plurality of main electrodes between which a discharge is to pass, at least one of said electrodes being composed of mercury, a conductor immersed in said mercury electrode between which and said mercury a current is to pass to initiate a discharge between said main electrodes, means for supplying a sub-starting current between said conductor and said mercury and means for supplying a starting current between said conductor and said mercury.

39. Apparatus according to claim 38 characterized by the fact that the sub-starting current is continuously applied and the starting current is intermittently applied.

40. Translating apparatus comprising a source of alternating-current, electric discharge means operating in effect as a first discharge path having an anode, a cathode and a control electrode, a second discharge path having an anode, a cathode and a control electrode, means for so connecting said discharge means to said source that a difference of potential is normally impressed between the anode of the first path and the anode of the second and between the cathode of the first path and the cathode of the second, unitary means for supplying electrical energy to both said control electrodes, and complete conductive connections between said unitary means and said control electrodes.

41. Apparatus according to claim 40 characterized by the fact that the unitary means is of the type that supplies direct current electrical energy.

42. Translating apparatus comprising a source of alternating current, electric discharge means operating in effect as a first discharge path having an anode, a cathode and a control electrode, a second discharge path having an anode, a cathode and a control electrode, means for so connecting said discharge means to said source that a difference of potential is normally impressed between the anode of the first path and the anode of the second and between the cathode of the first path and the cathode of the second, means for supplying electrical energy to both said control electrodes, and means for compensating for said difference of potential between said cathodes of said discharge paths.

43. Translating apparatus comprising a source of alternating current, electric discharge means operating in effect as a first discharge path having an anode, a cathode and a control electrode, a second discharge path having an anode, a cathode and a control electrode, means for so connecting said discharge means to said source that a difference of potential is normally impressed between the cathode of the first path and the cathode of the second, means for supplying an electrical control potential to each of said control electrodes which is referred to the cathode of the corresponding path, and means for compensating for said difference of potential between said cathodes of said discharge paths.

44. In combination a source of periodic current pulsations, valve means normally restraining the transmission of said current pulsations from said source, means for supplying excitation to said valve means to render said valve means active to permit transmission of current pulsations from said source, said excitation supply means including means to be rendered operative by the concurrent application of at least two potentials each of which is at least of a predetermined magnitude, means for supplying one of said potentials continuously for a predetermined interval of time that is at least of the order of a period of said source, said means operating to initiate said supply of potential at an instant independent of the periodicity of said source and means for supplying the other of said potentials for an interval of time that is short compared to a period of said source and at a predetermined point in a cycle of said source.

45. In combination a source of periodic current pulsations, means to be rendered operative, to control said source, by the concurrent application of at least two potentials each of which is at least of a predetermined magnitude, means for supplying one of said potentials continuously for a predetermined interval of time that is at least of the order of a period of said source, said means operating to initiate said supply of potential at an instant independent of the periodicity of said source and means for supplying the other of said potentials for an interval of time that is short compared to a period of said source and at a predetermined point in a cycle of said source.

46. Apparatus for supplying power to a load comprising a source of periodic current pulsations, means to be rendered operative, to permit current flow from said source to said load, by the concurrent application of at least two potentials each of which is at least of a predetermined magnitude, means for supplying one of said potentials continuously for a predetermined interval of time that is at least of the order of a period of said source, said means operating to initiate said supply of potential at an instant independent of the periodicity of said source and means for supplying the other of said potentials for an interval of time that is short compared to a period of said source and at a predetermined point in a cycle of said source.

47. Apparatus according to claim 46 characterized by the fact that the load is reactive and the predetermined point in the cycle at which the potential of short duration is supplied is the point at which the current through the load, if supplied continuously under the action of the periodic source, would pass through zero.

48. Apparatus according to claim 45 characterized by the fact that the continuous potential is applied by the operation of manual means.

49. Apparatus for supplying power from a source of periodic current pulsations to a load comprising means, including a discharge path in a gaseous atmosphere having a control electrode, for controlling the supply of current from said source to said load, said discharge path being energized by impressing potentials of predetermined relative magnitude across the path and on said control electrode, means for impressing a potential across said discharge path for an interval of time that is at least of the order of a period of said source, said potential being impressed at an instant independent of the periodicity of said source and means for impressing a potential on said control electrode for an interval of time that is short compared to the periodicity of said source and at an instant corresponding to a predetermined point in a cycle of said source, said potentials being of such relative magnitude as to energize said discharge path.

50. In a power system, an alternating-current power source, a power circuit connected to supply alternating current of the same frequency as said source from said source to a load device, and means for controlling the flow of said alternating current to the load device comprising electric discharge means connected in the power circuit, and means for producing impulses of short duration compared to a half-period of said alternating current in synchronism with said alternating current and connected to said electric discharge means for initiating the operation thereof at times which are predeterminable at will.

51. An electric power system comprising, in combination, a source of alternating current, a load device, circuit means connecting the source of alternating current to the load device, a pair of inversely connected electric-discharge devices connected in said circuit means for controlling the flow of alternating current to said load device, and impulsing means for providing potential impulses of short duration compared to a half-period of said alternating current, said potential impulses being synchronized with said alternating current and connected to said discharge devices for initiating the operation thereof at predetermined times.

52. In a power system, an alternating-current power source, a power circuit connected to supply alternating current of the same frequency as that of said source from said source to a load device and means for controlling the flow of said alternating current to the load device comprising electric discharge means connected in the power circuit, and means for producing impulses of short duration compared to the duration of a half period of said alternating current in synchronism with said alternating current and connected to said electric discharge means for initiating the operation thereof at times which are predeterminable at will.

53. In a power system, a power circuit connected to supply alternating current to a load device, electric discharge means interposed in said circuit and adapted to conduct succeeding half-cycles of the alternating current to said load device as alternating current, control means connected to render said electric discharge means conducting, and means for adjusting said control means to render said electric discharge means conducting, at the earliest, at the instant of the instantaneous minimum current value to vary the average value of the current flowing in said power circuit.

54. In a power system, a power circuit connected to supply alternating current to a load device, electric discharge means interposed in said circuit and adapted to conduct succeeding half-cycles of the alternating current to said load device as alternating current, control means connected to render said electric discharge means conducting, and means for adjusting said control means to render said electric discharge means conducting, at the earliest, at the point in the half-cycles of the alternating current at which current through said load device, if supplied continuously under the action of the alternating source, would pass through zero, to vary the average value of the current flowing in said power circuit.

55. Apparatus for supplying power to weld a material from a source of periodically pulsating current comprising a welding transformer, means for connecting the secondary of said transformer across said material, connections between said source and the primary of said transformer, said connections being interrupted by electric discharge means of the mercury pool type and means operating in synchronism with said source for rendering said discharge means conductive so that it transmits current from said source to said primary.

56. Apparatus for supplying power to weld a material from a source of current comprising a welding transformer, means for connecting the secondary of said transformer across said material, a plurality of conductors interconnecting said source and the primary of said transformer, a discharge path in one of said conductors including an electrode of the mercury type, and a collecting electrode to cooperate with the mercury electrode, said mercury electrode, in the absence of a discharge, presenting an un-ionized surface to said collecting electrode, and said path, in the absence of a discharge constituting an open circuit in said one conductor, a discharge initiating electrode associated with said mercury electrode and means for energizing said initiating electrode to render said path conductive so that its transmits current to said primary.

57. Apparatus for supplying power to weld a material from a source of alternating current comprising a welding transformer, means for connecting the secondary of said transformer across said material, connections between the source and the primary of the transformer, said connections including a conductor connected between a terminal of said source and a terminal of said primary, a pair of electric discharge devices of the mercury pool type connected in anti-parallel in said conductor and, when non-conducting, constituting an open circuit gap in said conductor and means for rendering said devices conductive during a predetermined number of half-periods of said source so that they transmit alternating current from said source to said primary.

58. Apparatus for supplying power to weld a material from a source of alternating current comprising a welding transformer, means for connecting the secondary of said transformer across said material, connections between the source and the primary of the transformer, said connections including a conductor connected between a terminal of said source and a terminal of said primary, a pair of electric discharge devices of the mercury pool type connected in anti-parallel in said conductor and, when non-conductive, constituting an open circuit gap in said conductor and means operating in synchronism with said source for rendering said devices conductive during a predetermined number of half-periods of said source so that they transmit alternating current from said source to said primary.

59. Apparatus for supplying power to weld a material from a source of alternating current comprising a welding transformer, means for connecting the secondary of said transformer across said material, connections between the source and the primary of the transformer, said connections including a conductor connected between a terminal of said source and a terminal of said primary, a pair of electric discharge devices of the mercury pool type connected in anti-parallel in said conductor and, when non-conductive, constituting an open circuit gap in said conductor and means for rendering said devices conductive during a predetermined number of half-periods of said source so that they transmit alternating current from said source to said primary, said means for rendering said devices conductive including means for impressing an impulse of short duration compared to a half-period of said source for initiating the conductivity of said devices at a predetermined instant in a half-period of said source.

60. Apparatus for supplying power to weld a material from a source of periodically pulsating current comprising a welding transformer, means for connecting the secondary of said transformer across said material, connections between said source and the primary of said transformer, said connections being interrupted by electric discharge means of the mercury pool type and means for rendering said discharge means conductive so that its transmits current from said source to said primary, said means for rendering said discharge means conductive including means for impressing an impulse of short duration compared to a period of said source for initiating the conductivity of said discharge means at a predetermined instant in a period of said source.

61. Apparatus for supplying power to weld a material from a source of current comprising a welding transformer, means for connecting the secondary of said transformer across said material, connections between said source and the primary of said transformer, said connections being interrupted by electric discharge means of the mercury pool type and means for rendering said discharge means conductive so that it transmits current from said source to said primary.

62. In a control system, in combination, a source of alternating current, a load, circuit means connecting the source of alternating current to the load, a pair of inversely connected space-discharge devices interposed between the source of alternating current and the load for controlling the flow of current to the load, a control electrode in each of said space-discharge devices, an auxiliary electric discharge valve in circuit with said control electrodes, means for rendering said valve conductive for applying an energizing potential to said control electrodes to render said space-discharge devices conductive while said valve is conductive, a cut-off space-discharge device connected in circuit with said control electrodes, and means for rendering said cut-off device conductive for effecting the removal of the energizing potential from the control electrodes at the instant when said cut-off device is rendered conductive to render the pair of space-discharge devices non-conductive.

63. In a control system, in combination, a source of alternating current, a load, circuit means connecting the source of alternating current to the load, a pair of inversely connected space-discharge devices interposed between the source of alternating current and the load for controlling the flow of current to the load, a control electrode in each of said space-discharge devices, an auxiliary electric discharge valve in circuit with said control electrodes, means for rendering said valve conductive for applying an energizing potential to said control electrodes to render said space-discharge devices conductive while said valve is conductive, and cut-off means for effecting the removal of the energizing potential from the control electrodes while said valve remains conductive to render the pair of space-discharge devices non-conductive.

64. For use in supplying current from a source of alternating current to a load, the combination comprising a pair of main electric discharge valves interposed in anti-parallel between said source and said load for controlling the flow of current from said source to said load, each of said valves having a control electrode, an auxiliary electric discharge valve in circuit with the control electrode of each of said main valves for controlling the conductivity of said main valves, each of said auxiliary valves having a control electrode and said main valves being rendered conductive when said auxiliary valves are rendered conductive, means for rendering said auxiliary valves conductive including a third auxiliary valve in circuit with the control electrodes of said first-named auxiliary valves, said third valve having a control electrode and said first-named auxiliary valves being rendered conductive when said third valve is rendered conductive, and means for rendering said third valve conductive including a fourth auxiliary valve in circuit with the control electrode of said third valve, said third valve being rendered conductive when said fourth valve is rendered conductive.

65. For use in supplying current from a source of alternating current to a load, the combination comprising a pair of main electric discharge valves interposed in anti-parallel between said source and said load for controlling the flow of current from said source to said load, each of said valves having a control electrode, an auxiliary electric discharge valve in circuit with the control electrode of each of said main valves for controlling the conductivity of said main valves, each of said auxiliary valves having a control electrode and said main valves being rendered conductive when said auxiliary valves are rendered conductive, means for rendering said auxiliary valves conductive including a third auxiliary valve in circuit with the control electrodes of said first-named auxiliary valves, said third valve having a control electrode and said first-named auxiliary valves being rendered conductive when said third valve is rendered conductive, and means for rendering said third valve conductive including a fourth auxiliary valve in circuit with the control electrode of said third valve.

66. For use in supplying current from a source of alternating current to a load, the combination comprising a pair of main electric discharge valves interposed in anti-parallel between said source and said load for controlling the flow of current from said source to said load, each of said valves having a control electrode, an auxiliary electric discharge valve in circuit with the control electrode of each of said main valves for controlling the conductivity of said main valves, each of said auxiliary valves having a control electrode and said main valves being rendered conductive when said auxiliary valves are rendered conductive, means for rendering said auxiliary valves conductive including a third auxiliary valve in circuit with the control electrodes of said first-named auxiliary valves, said third valve having a control electrode and said first-named auxiliary valves being rendered conductive when said third valve is rendered conductive, means for rendering said third valve conductive including a fourth auxiliary valve in circuit with the control electrode of said third valve, said fourth valve having a control electrode and a phase shift network in circuit with said last-named control electrode.

67. For use in supplying current from a source of alternating current to a load, the combination comprising a pair of ignitrons interposed in anti-parallel between said source and said load, each of said ignitrons having an igniter, a firing valve connected in parallel with each said ignitron through the corresponding igniter, each said firing valve having a control electrode, an auxiliary valve connected in circuit with said control electrodes, said auxiliary valve having a control electrode, and a second auxiliary valve connected in circuit with said last-named control electrode.

68. For use in supplying current from a source of alternating current to a load, the combination comprising a pair of ignitrons interposed in anti-parallel between said source and said load, each of said ignitrons having an igniter, a firing valve connected in parallel with each said ignitron through the corresponding igniter, each said firing valve having a control electrode, an auxiliary valve connected in circuit with said control electrodes, said auxiliary valve having a control electrode, a second auxiliary valve including a control electrode connected in circuit with said last-named electrode, the circuit between said second valve and the control electrode of said first valve having interposed therein a readily saturable transformer for impressing impulses of short duration compared to a period of said source on the control electrode of said first valve and a phase shift network in circuit with the control electrode of said third valve.

69. For use in supplying current from a source of alternating current to a load, the combination comprising a pair of ignitrons interposed in anti-parallel between said source and said load, each of said ignitrons having an igniter, a firing valve connected in parallel with each said ignitron through the corresponding igniter, each said firing valve having a control electrode, an auxiliary valve connected in circuit with said control electrodes, said auxiliary valve having a control electrode, a second auxiliary valve including a control electrode connected in circuit with said last-named electrode and a phase shift network in circuit with the control electrode of said third valve.

70. In a control system, in combination, a source of alternating current, a load, circuit means connecting the source of alternating current to the load, a pair of inversely connected space-discharge devices interposed between the source of alternating current and the load for controlling the flow of current to the load, a control electrode in each of said space-discharge devices, a source of direct current, a start space-discharge device connected to said control electrodes and to the source of direct current, means for energizing said start device to apply energizing potential to said control electrodes to render the pair of space-discharge devices conducting, a cut-off space-discharge device connected to said control electrodes and timing means responsive to said start device, while it is conductive, to render said cut-off device conductive for effecting the removal of the energizing potential from said control electrodes, after said start device has been conductive for a time interval predeterminable at will, to render the pair of space discharge devices non-conductive.

71. Apparatus for supplying power to a load that requires pulses of current each of which is precisely of a predetermined magnitude comprising a source of alternating current, circuit means connecting said source to said load, electric discharge means interposed in said circuit means for controlling the flow of current through said circuit means, means for energizing said discharge means and means to be manually operated from a non-functioning to a functioning position for initiating the operation of said energizing means, said energizing means including means for maintaining said discharge means energized, after said manual means has been once operated, for an interval of time such that a pulse of current of said predetermined magnitude is delivered to said load and for thereafter maintaining said discharge means deenergized even if said manually operative means is reverted to said non-functioning position prior to the termination of said interval of time or is maintained in said functioning position after the termination of said interval of time.

72. Apparatus for supplying power from a source of periodically pulsating current to a load that requires current having a magnitude of the order of several thousand amperes comprising a high-ratio step-down stationary transformer, means for connecting the secondary of said transformer to said load, connections between said source and the primary of said transformer, said connections being interrupted by electric discharge means of the mercury pool type and means operating in synchronism with said source for rendering said discharge means conductive so that it transmits current from said source to said primary.

73. Apparatus for supplying power from a source of periodically pulsating current to a load that requires current having a magnitude of the order of several thousand amperes comprising a high-ratio step-down stationary transformer, means for connecting the secondary of said transformer to said load, connections between said source and the primary of said transformer, said connections being adapted to carry current having a magnitude of the order of one thousand amperes and being interrupted by electric discharge means of the mercury pool type, and means operating in synchronism with said source for rendering said discharge means conductive so that it transmits current from said source to said primary.

74. Apparatus for supplying power from a source of current to a load that requires current having a magnitude of the order of several thousand amperes comprising a high-ratio step-down transformer, means for connecting the secondary of said transformer to said load, a plurality of conductors interconnecting said source and the primary of said transformer, a discharge path in one of said conductors including an electrode of the mercury pool type, and a collecting electrode to cooperate with the mercury electrode, said mercury electrode, in the absence of a discharge, presenting an un-ionized surface to said collecting electrode, and said path, in the absence of a discharge constituting an open circuit in said one conductor, a discharge initiating electrode associated with said mercury electrode and means for energizing said initiating electrode to render said path conductive so that it transmits current to said primary.

75. Apparatus for supplying power from a source of alternating current to a load that requires current having a magnitude of the order of several thousand amperes comprising a high-ratio step-down transformer, means for connecting the secondary of said transformer to said load, connections between the source and the primary of the transformer, said connections including a conductor connected between a terminal of said source and a terminal of said primary, a pair of electric discharge devices of the mercury pool type connected in anti-parallel in said conductor, and, when non-conductive, constituting an open circuit gap in said conductor and means operating in synchronism with said source for rendering said devices conductive during a predetermined number of half-periods of said source so that they transmit alternating current from said source to said primary.

76. Apparatus for supplying power from a source of alternating current to a load comprising a transformer, means for connecting the secondary of said transformer to said load, connections between the source and the primary of the transformer, said connections including a conductor connected between a terminal of said source and a terminal of said primary, a pair of electric discharge devices of the mercury pool type connected in anti-parallel in said conductor and, when non-conductive, constituting an open circuit gap in said conductor and means for rendering said devices conductive during a predetermined number of half-periods of said source so that they transmit alternating current from said source to said primary, said means for rendering said devices conductive including means for impressing an impulse of short duration compared to a half-period of said source for initiating the conductivity of said devices at a predetermined instant in a half-period of said source.

77. Apparatus for supplying power from a source of periodically pulsating current to a load comprising a transformer, means for connecting the secondary of said transformer to said load, connections between said source and the primary of said transformer, said connections being interrupted by electric discharge means of the mercury pool type and means for rendering said discharge means conductive so that it transmits current from said source to said primary, said means for rendering said discharge means conductive including means for impressing an impulse of short duration compared to a period of said source for initiating the conductivity of said discharge means at a predetermined instant in a period of said source.

78. Apparatus for supplying power from a source of current to a load that requires current having a magnitude of the order of several thousand amperes comprising a high-ratio step-down stationary transformer, means for connecting the secondary of said transformer to said load, connections between said source and the primary of said transformer, said connections being interrupted by electric discharge means of the mercury pool type and means for rendering said discharge means conductive so that it transmits current from said source to said primary.

79. Apparatus for supplying power from a source of current to a load that has the properties of a short-circuit which is open-circuited intermittently comprising a high-ratio step-down stationary transformer, means for connecting the secondary of said transformer across said load so that said load short-circuits said secondary, connections between said source and the primary of said transformer, said connections being interrupted by electric discharge means of the mercury-pool type and means for rendering said discharge means conductive so that it transmits current from said source to said primary.

JOHN W. DAWSON.